US012043508B2

(12) United States Patent
Oikawa et al.

(10) Patent No.: US 12,043,508 B2
(45) Date of Patent: Jul. 23, 2024

(54) MEDIUM PROCESSING APPARATUS AND IMAGE FORMING SYSTEM INCORPORATING SAME

(71) Applicants: Naoki Oikawa, Kanagawa (JP); Kei Sasaki, Kanagawa (JP); Kazuki Seto, Kanagawa (JP)

(72) Inventors: Naoki Oikawa, Kanagawa (JP); Kei Sasaki, Kanagawa (JP); Kazuki Seto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/158,018

(22) Filed: Jan. 23, 2023

(65) Prior Publication Data

US 2023/0242370 A1 Aug. 3, 2023

(30) Foreign Application Priority Data

Jan. 31, 2022 (JP) ................................ 2022-013069
Nov. 29, 2022 (JP) ................................ 2022-190408

(51) Int. Cl.
*B65H 37/04* (2006.01)
*B42C 1/12* (2006.01)

(52) U.S. Cl.
CPC ............... *B65H 37/04* (2013.01); *B42C 1/12* (2013.01); *B65H 2301/51616* (2013.01); *B65H 2515/40* (2013.01); *B65H 2801/27* (2013.01)

(58) Field of Classification Search
CPC ...... B31F 2201/0779; B31F 2201/0758; B31F 2201/0702; B65H 2301/51616; B65H 2301/43828; B65H 37/04; G03G 2215/00852; G03G 15/6544; B42C 1/12
USPC ...................................................... 270/58.08
See application file for complete search history.

(56) References Cited

U.S. PATENT DOCUMENTS

| | | | | |
|---|---|---|---|---|
| 9,399,841 | B2 * | 7/2016 | Yamada | B31D 1/0075 |
| 10,406,772 | B2 * | 9/2019 | Takahashi | B42C 1/12 |
| 10,654,240 | B2 * | 5/2020 | Takahashi | B65H 37/04 |
| 11,383,951 | B2 * | 7/2022 | Kawakami | B41J 11/58 |

(Continued)

FOREIGN PATENT DOCUMENTS

| | | |
|---|---|---|
| JP | 2014-058368 | 4/2014 |
| JP | 2014-104183 | 6/2014 |

(Continued)

OTHER PUBLICATIONS

Espacenet machine translation of JP2014201432A; https://translationportal.epo.org/emtp/translate/?ACTION=description-retrieval&COUNTRY=JP&ENGINE=google&FORMAT=docdb&KIND=A&LOCALE=en_EP&NUMBER=2014201432&OPS=ops.epo.org/3.2&SRCLANG=ja&TRGLANG=en (Year: 2014).*

*Primary Examiner* — Leslie A Nicholson, III
(74) *Attorney, Agent, or Firm* — IPUSA, PLLC

(57) ABSTRACT

A medium processing apparatus includes a conveyor, a liquid applier, and a crimper. The conveyor conveys a medium. The liquid applier performs liquid application of applying liquid to a part of the medium conveyed by the conveyor, the medium being at least one medium. The crimper presses and deforms a bundle of media including the medium to which the liquid is applied by the liquid applier, to bind the bundle of media. The liquid applier adjusts an application amount of the liquid in the liquid application according to an environmental condition that is a factor that affects a binding strength with which the bundle of media is bound by pressing and deforming of the crimper.

4 Claims, 25 Drawing Sheets

(56) References Cited

U.S. PATENT DOCUMENTS

| | | | |
|---|---|---|---|
| 2011/0076081 | A1 | 3/2011 | Hattori et al. |
| 2011/0130260 | A1 | 6/2011 | Kikkawa et al. |
| 2011/0245055 | A1 | 10/2011 | Saito et al. |
| 2011/0301005 | A1 | 12/2011 | Hattori et al. |
| 2011/0301008 | A1 | 12/2011 | Shibasaki et al. |
| 2011/0301011 | A1 | 12/2011 | Ishikawa et al. |
| 2012/0083400 | A1 | 4/2012 | Shibasaki et al. |
| 2012/0115702 | A1 | 5/2012 | Ishikawa et al. |
| 2012/0147388 | A1 | 6/2012 | Kojima et al. |
| 2012/0157285 | A1 | 6/2012 | Aiba et al. |
| 2014/0219747 | A1 | 8/2014 | Takahashi et al. |
| 2018/0339485 | A1* | 11/2018 | Takahashi ................. B42C 1/12 |
| 2020/0101688 | A1* | 4/2020 | Takahashi .......... B65H 31/3081 |
| 2020/0307945 | A1 | 10/2020 | Mori et al. |
| 2022/0334525 | A1 | 10/2022 | Sasaki et al. |
| 2022/0394145 | A1* | 12/2022 | Seto ................... H04N 1/00631 |

FOREIGN PATENT DOCUMENTS

| | | |
|---|---|---|
| JP | 2014-148398 | 8/2014 |
| JP | 2014-201432 | 10/2014 |

* cited by examiner

MEDIUM PROCESSING APPARATUS AND IMAGE FORMING SYSTEM INCORPORATING SAME

CROSS-REFERENCE TO RELATED APPLICATIONS

This patent application is based on and claims priority pursuant to 35 U.S.C. § 119(a) to Japanese Patent Application Nos. 2022-013069, filed on Jan. 31, 2022, and 2022-190408, filed on Nov. 29, 2022, in the Japan Patent Office, the entire disclosure of each of which is hereby incorporated by reference herein.

BACKGROUND

Technical Field

Embodiments of the present disclosure relate to a medium processing apparatus and an image forming system incorporating the medium processing apparatus.

Related Art

Medium processing apparatuses are known in the art that perform binding to form a sheet bundle, which is a bundle of stacked sheet-shaped media on which images are formed. Some medium processing apparatuses are known in the art that perform binding without metal binding needles (i.e., staples) from a viewpoint of resource saving and reduction in environmental load. Such medium processing apparatuses include a crimper that can perform so-called "crimp binding." Specifically, the crimper sandwiches a sheet bundle with serrate binding teeth to press and deform the sheet bundle. Sheets of paper are widely known as an example of sheet-shaped media. For this reason, in the following description, a bundle of sheets of paper as a plurality of media is an example of a sheet bundle.

An increased number of sheets of the sheet bundle hamper the binding teeth in biting into the sheet bundle and may cause some sheets to peel off from the sheet bundle crimped and bound. Thus, the crimp binding may have some disadvantages in the binding strength and keeping of the binding state. To enhance the binding strength, some medium processing apparatuses that perform the crimp binding include a liquid applier that applies liquid in advance to a position on a sheet where the binding teeth contact the sheet, to allow the binding teeth to easily bite into a sheet bundle.

SUMMARY

According to an embodiment of the present disclosure, a medium processing apparatus includes a conveyor, a liquid applier, and a crimper. The conveyor conveys a medium. The liquid applier performs liquid application of applying liquid to a part of the medium conveyed by the conveyor, the medium being at least one medium. The crimper presses and deforms a bundle of media including the medium to which the liquid is applied by the liquid applier, to bind the bundle of media. The liquid applier adjusts an application amount of the liquid in the liquid application according to an environmental condition that is a factor that affects a binding strength with which the bundle of media is bound by pressing and deforming of the crimper.

According to another embodiment of the present disclosure, an image forming system includes an image forming apparatus and the medium processing apparatus. The image forming apparatus includes an image former to form an image on a plurality of media. The medium processing apparatus crimps and binds the plurality of media on which the image is formed by the image forming apparatus.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
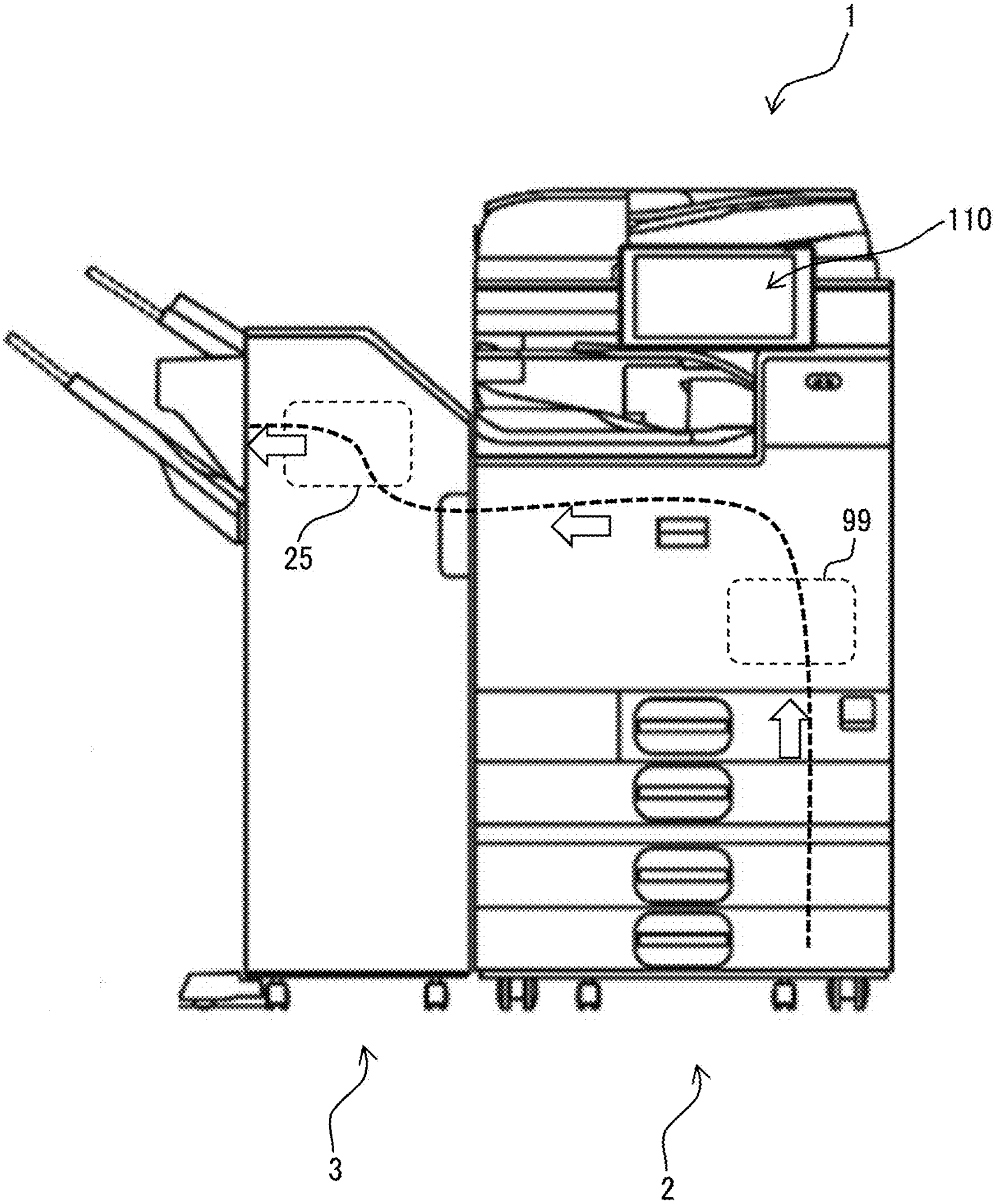
FIG. 1 is a diagram illustrating an overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

Hereinafter, an embodiment of the present disclosure applied to a color laser printer (hereinafter, simply referred to as a printer) that is an image forming apparatus will be described.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Initially, a description is given of a first embodiment of the present disclosure.

With reference to the drawings, a description is now given of an image forming system 1 according to an embodiment of the present disclosure. FIG. 1 is a diagram illustrating the overall configuration of the image forming system 1. The image forming system 1 has a function of forming an image on a sheet P as a sheet-shaped medium and performing post-processing on the sheet P on which the image is formed. As illustrated in FIG. 1, the image forming system 1 includes an image forming apparatus 2 and a post-processing apparatus 3 serving as a medium processing apparatus according to the embodiments of the present disclosure. In the image forming system 1, the image forming apparatus 2 and the post-processing apparatus 3 operate in conjunction with each other.

The image forming apparatus 2 forms an image on the sheet P and outputs the sheet P bearing the image to the post-processing apparatus 3. The image forming apparatus 2 includes an accommodation tray that accommodates the sheet P, a conveyor that conveys the sheet P accommodated in the accommodation tray, and an image former 99 that forms an image on the sheet P conveyed by the conveyor. The image former 99 may be an inkjet image forming device that forms an image with ink or an electrophotographic image forming device that forms an image with toner. Since the image forming apparatus 2 has a typical configuration, a detailed description of the configuration and functions of the image forming apparatus 2 are omitted.

In addition, the post-processing apparatus 3 includes an edge binder 25 described later. In the image forming system 1 illustrated in FIG. 1, a conveyance path from the image former 99 to the edge binder 25 is indicated by a broken line. The conveyance process from the image former 99 to the edge binder 25 is an example of an environmental condition as a variation factor that may affect the binding strength of the binding process in the edge binder 25.

Figure 16:
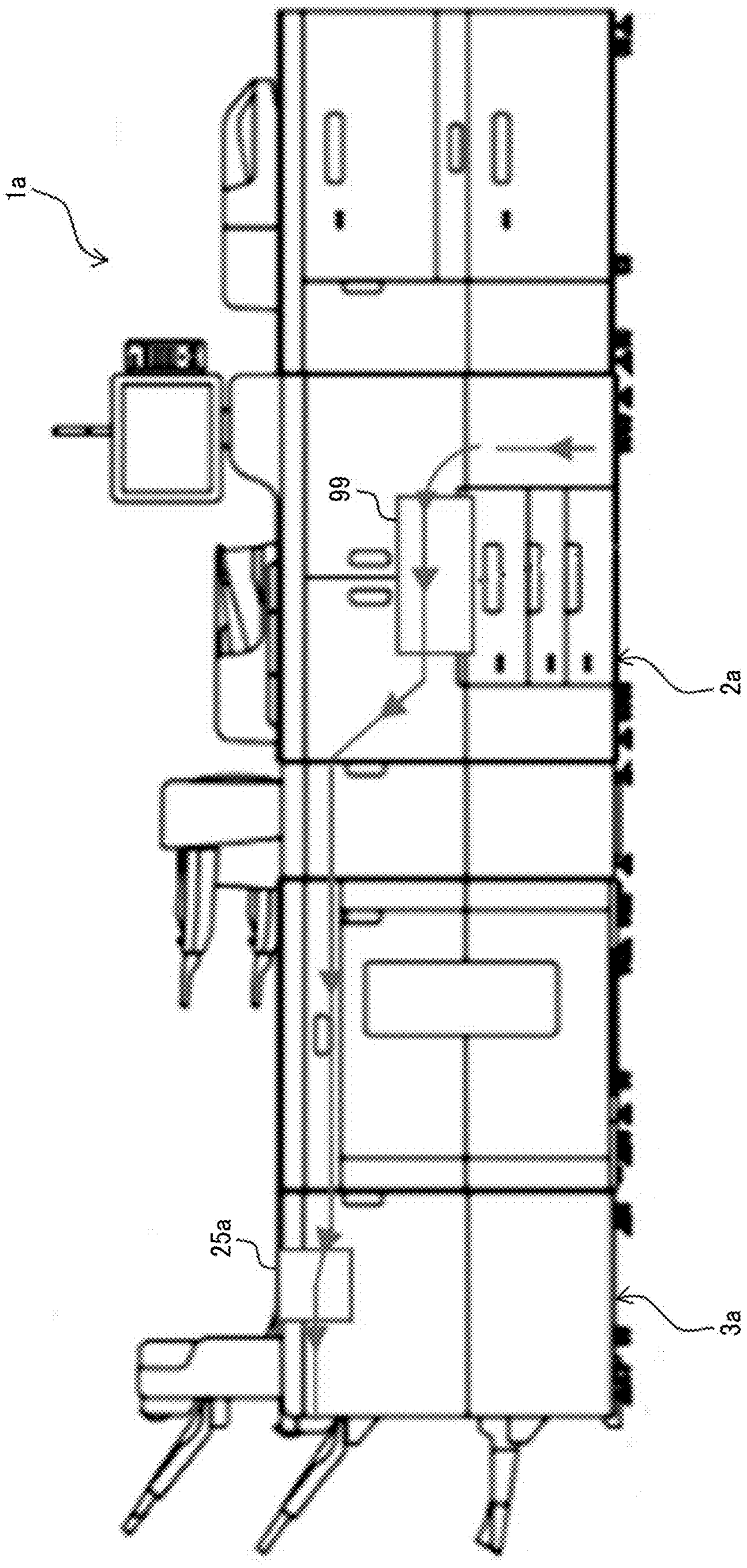
FIG. 16 is a diagram illustrating the overall configuration of an image forming system according to another embodiment of the present disclosure.

For example, in an image forming system 1*a* as illustrated in FIG. 16, the conveyance distance from an image former 99*a* to an edge binder 25*a* is longer than the conveyance distance from the image former 99 to the edge binder 25 in the image forming system 1. Accordingly, in the image forming system 1*a*, when the liquid application process is executed before the binding process is performed with the edge binder 25*a*, the condition of the sheet P is different from that in the case of the image forming system 1. For this reason, unless the amount of liquid to be applied is adjusted in accordance with the condition occurring in the image forming system 1*a*, the binding strength at which the sheets P are bundled and bound is not set to an appropriate strength, and the liquid application amount is not set to a proper amount of liquid to be applied for maintaining the bound state.

In addition, in each of the image former 99 of the image forming system 1 and the image former 99*a* of the image forming system 1*a*, the temperature environment applied to the sheet P is different depending on the image forming process as the pre-processing to be executed. The condition of the sheet P when the liquid application process is performed varies depending on the temperature environment. For this reason, unless the amount of liquid to be applied is adjusted in accordance with the temperature environment, the proper amount of liquid to be applied for maintaining the binding strength is not obtained.

Figure 2:
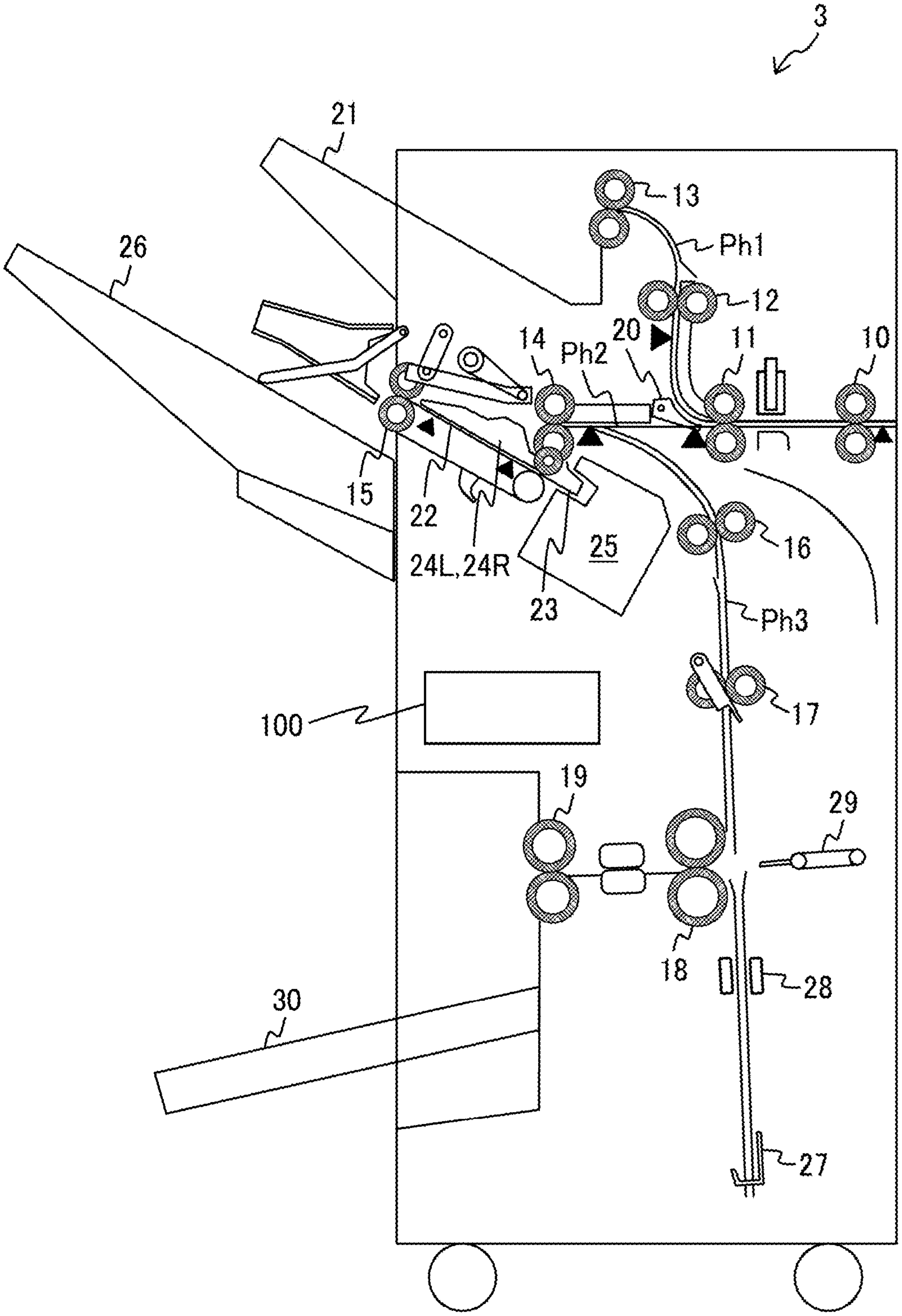
FIG. 2 is a diagram illustrating an internal configuration of a post-processing apparatus according to a first embodiment of the present disclosure.

FIG. 2 is a diagram illustrating an internal configuration of the post-processing apparatus 3 according to the first embodiment of the present disclosure. The post-processing apparatus 3 performs given post-processing on the sheet P on which an image is formed by the image forming apparatus 2. The post-processing according to the present embodiment is binding or a binding process as "crimp binding process" to bind, without staples, a bundle (sheet bundle) of a plurality of sheets P on which images are formed. In the following description, the bundle of sheets P may be referred to as a "sheet bundle Pb" as a bundle of media. More specifically, the binding according to the present embodiment is so-called "crimp binding," in other words, pressing and deforming the sheet bundle Pb at a binding position. The binding that can be executed by the post-processing apparatus 3 includes edge stitching and saddle stitching. The edge stitching is a process to bind an edge of the sheet bundle Pb. The saddle stitching is a process to bind the center of the sheet bundle Pb.

The post-processing apparatus 3 includes conveyance roller pairs 10 to 19 serving as conveyors and a switching claw 20. The conveyance roller pairs 10 to 19 convey, inside the post-processing apparatus 3, the sheet P supplied from the image forming apparatus 2. Specifically, the conveyance roller pairs 10 to 13 convey the sheet P along a first conveyance passage Ph1. The conveyance roller pairs 14 and 15 convey the sheet P along a second conveyance passage Ph2. The conveyance roller pairs 16 to 19 convey the sheet P along a third conveyance passage Ph3.

The first conveyance passage Ph1 is a passage extending to an output tray 21 from a supply port through which the sheet P is supplied from the image forming apparatus 2. The second conveyance passage Ph2 is a passage branching from the first conveyance passage Ph1 between the conveyance roller pairs 11 and 14 in a conveyance direction and extending to an output tray 26 via an internal tray 22. The third conveyance passage Ph3 is a passage branching from the first conveyance passage Ph1 between the conveyance roller pairs 11 and 14 in the conveyance direction and extending to an output tray 30.

The switching claw 20 is disposed at a branching position of the first conveyance passage Ph1 and the second conveyance passage Ph2. The switching claw 20 can be switched between a first position and a second position. The switching claw 20 in the first position guides the sheet P to be output to the output tray 21 through the first conveyance passage Ph1. The switching claw 20 in the second position guides the sheet P conveyed through the first conveyance passage Ph1 to the second conveyance passage Ph2. When a trailing end of the sheet P entering the second conveyance passage Ph2 passes through the conveyance roller pair 11, the conveyance roller pair 14 is rotated in the reverse direction to guide the sheet P to the third conveyance passage Ph3. The post-processing apparatus 3 further includes a plurality of sensors that detects the positions of the sheet P in the first conveyance passage Ph1, the second conveyance passage Ph2, and the third conveyance passage Ph3. Note that each of the plurality of sensors is indicated by a black triangle in FIG. 2.

The post-processing apparatus 3 includes the output tray 21. The sheet P that is output through the first conveyance passage Ph1 rests on the output tray 21. Among the sheets P supplied from the image forming apparatus 2, the sheets P that are not bound are output to the output tray 21.

The post-processing apparatus 3 further includes the internal tray 22 serving as a receptacle, an end fence 23, side fences 24L and 24R, an edge binder 25, and the output tray 26. The internal tray 22, the end fence 23, the side fences 24L and 24R, and the edge binder 25 perform the edge stitching on the sheet bundle Pb constructed of a plurality of sheets P conveyed to the internal tray 22 from the second conveyance passage Ph2. Among the sheets P supplied from the image forming apparatus 2, the sheet bundle Pb subjected to the edge stitching is output to the output tray 26. The edge stitching includes parallel stitching, oblique stitching, and vertical stitching. The parallel stitching (see FIG. 18B) is a process to perform stitching along one side of the sheet bundle Pb parallel to the main scanning direction. The oblique stitching (see FIG. 18C) is a process to perform stitching at a corner of the sheet bundle Pb. The vertical stitching is a process to perform stitching along one side of the sheet bundle Pb parallel to the conveyance direction.

In the following description, a direction in which the sheet P is conveyed from the conveyance roller pair 15 toward the end fence 23 is defined as a "conveyance direction." A direction that is orthogonal to the conveyance direction and a thickness direction of the sheet P is defined as a "main scanning direction" or a "width direction of the sheet P."

The sheets P that are sequentially conveyed through the second conveyance passage Ph2 are temporarily placed on the internal tray 22 serving as a receptacle. The end fence 23 aligns the position, in the conveyance direction, of the sheet P or the sheet bundle Pb placed on the internal tray 22. The side fences 24L and 24R align the position, in the main scanning direction, of the sheet P or the sheet bundle Pb placed on the internal tray 22. The edge binder 25 binds an end of the sheet bundle Pb aligned by the end fence 23 and the side fences 24L and 24R. Then, the conveyance roller pair 15 outputs the sheet bundle Pb subjected to the edge stitching to the output tray 26.

Now, a detailed description is given of the edge binder 25.

Figure 3:
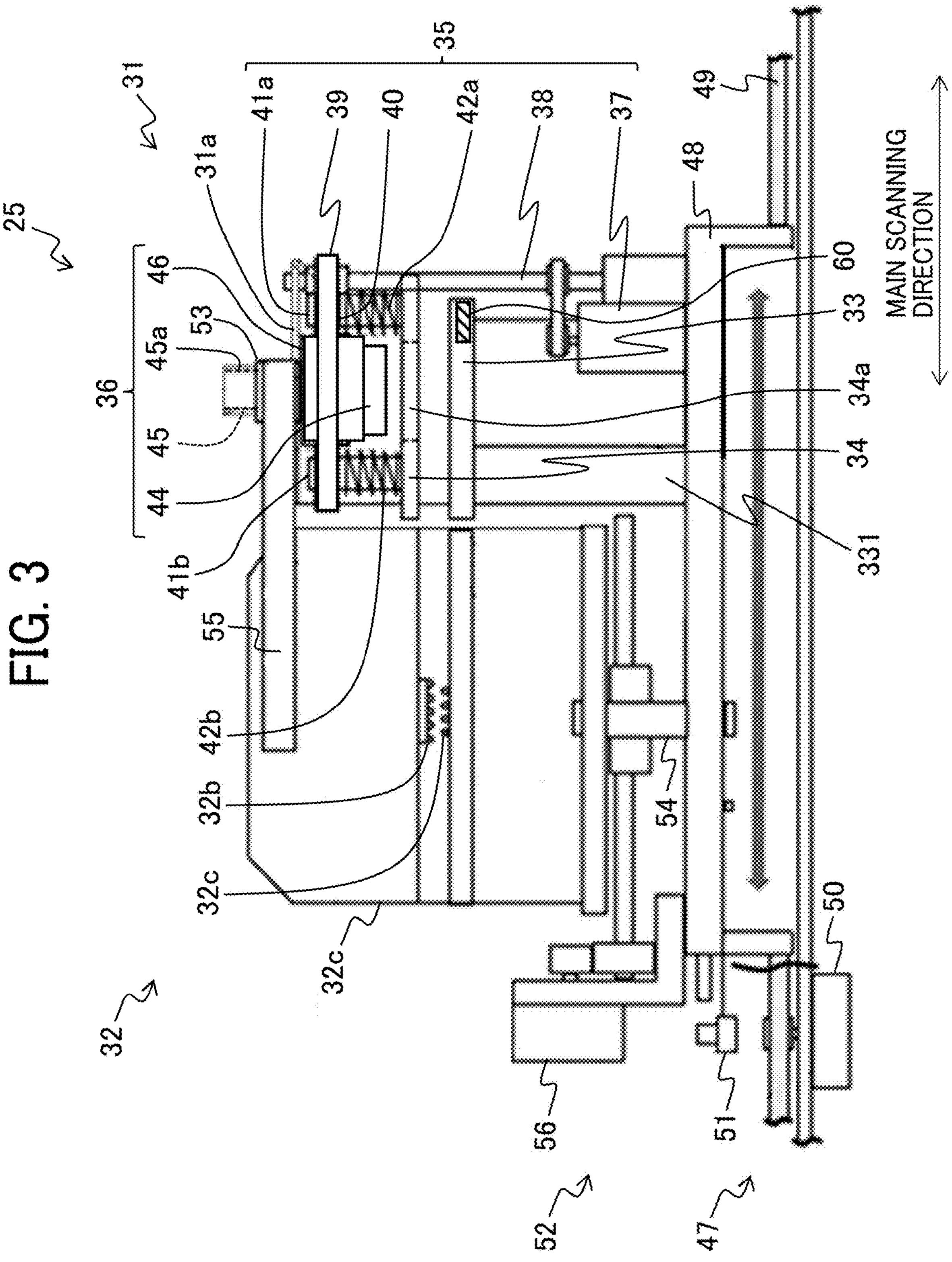
FIG. 3 is a schematic view of an upstream side of an edge binder of the post-processing apparatus of FIG. 2 in a conveyance direction.
Figure 4:
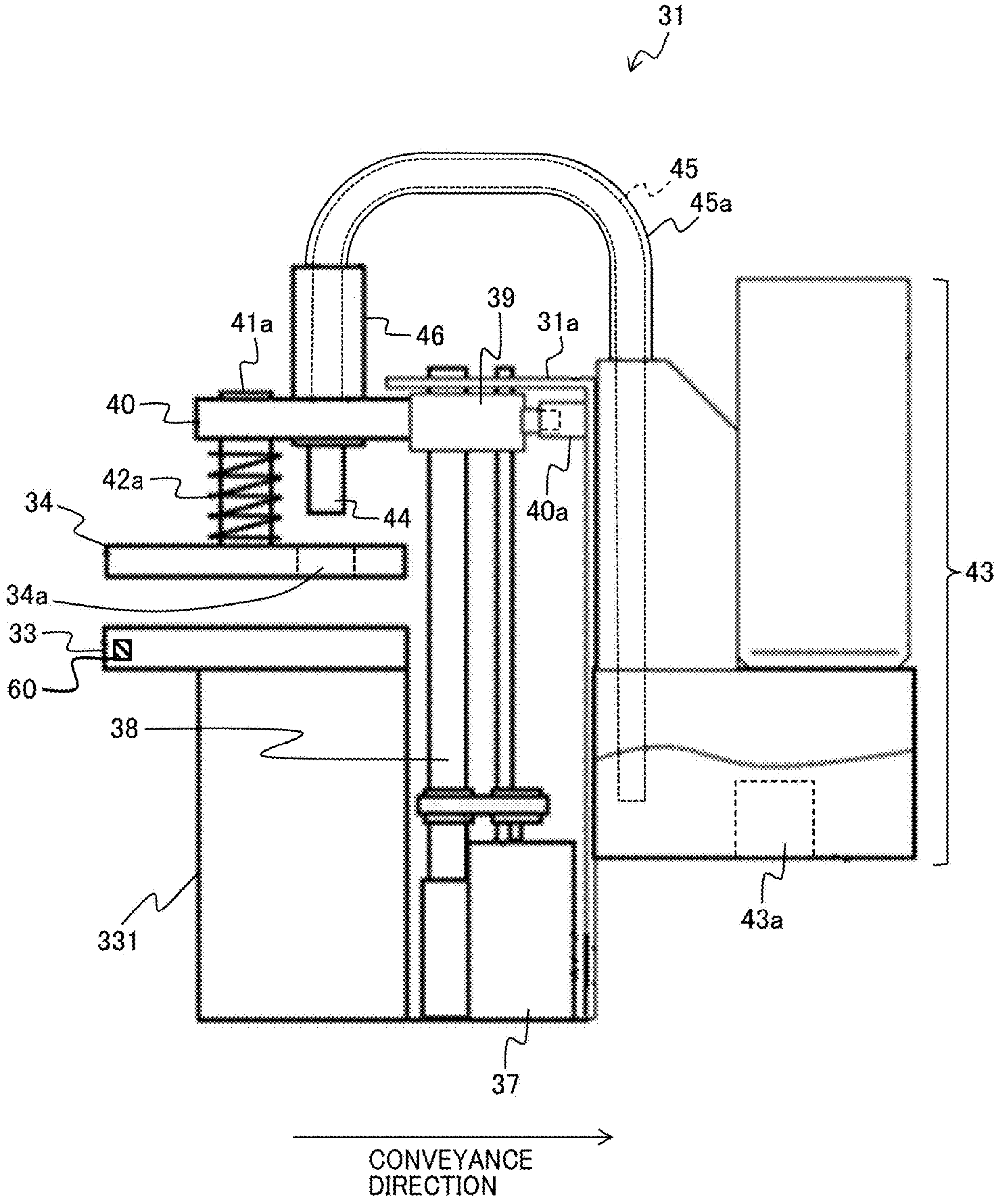
FIG. 4 is a schematic view of a liquid applier of the edge binder of FIG. 3 in a main scanning direction.

FIG. 3 is a schematic view of an upstream side of the edge binder 25 in the conveyance direction. FIG. 4 is a schematic view of a liquid applier 31 of the edge binder 25 in the main scanning direction. As illustrated in FIG. 3, the edge binder 25 includes the liquid applier 31 and a crimper 32 serving as a crimp binder. The liquid applier 31 and the crimper 32 are disposed adjacent to each other in the main scanning direction downstream from the internal tray 22 in the conveyance direction.

The liquid applier 31 applies liquid (for example, water) that is stored in a liquid storage tank 43 to the sheet P or the sheet bundle Pb placed on the internal tray 22. In the following description, the application of liquid such as water to the sheet P or the sheet bundle Pb may be referred to as "liquid application" whereas a process to apply liquid may be referred to as a "liquid application process."

More specifically, the liquid that is stored in the liquid storage tank 43 and used for the "liquid application" includes, as a main component, a liquid hydrogen-oxygen compound represented by the chemical formula $H_2O$. The liquid hydrogen-oxygen compound is at any temperature. For example, the liquid hydrogen-oxygen compound may be so-called warm water or hot water. The liquid hydrogen-oxygen compound is not limited to pure water. The liquid hydrogen-oxygen compound may be purified water or may contain ionized salts. The metal ion content ranges from so-called soft water to ultrahard water. In other words, the liquid hydrogen-oxygen compound is at any hardness.

The liquid that is stored in a liquid storage tank 43 may include an additive in addition to the main component. The liquid that is stored in the liquid storage tank 43 may include residual chlorine used as tap water. Preferably, for example, the liquid that is stored in the liquid storage tank 43 may include, as an additive, a colorant, a penetrant, a pH adjuster, a preservative such as phenoxyethanol, a drying inhibitor such as glycerin, or a combination thereof. Since water is used as a component of ink used for inkjet printers or ink used for water-based pens, such water or ink may be used for the "liquid application."

The water is not limited to the specific examples described above. The water may be water in a broad sense such as hypochlorous acid water or an ethanol aqueous solution diluted for disinfection. However, tap water may be used simply for the crimp binding because tap water is easy to obtain and store. A liquid including water as a main component as exemplified above enhances the binding strength of the sheet bundle Pb, as compared with a liquid of which the main component is not water.

As illustrated in FIGS. 3 and 4, the liquid applier 31 includes a lower pressure plate 33 serving as a receptacle for the sheet P or the sheet bundle Pb, an upper pressure plate 34, a liquid applier movement assembly 35, and a liquid application assembly 36. The components of the liquid applier 31 such as the lower pressure plate 33, the upper pressure plate 34, the liquid applier movement assembly 35, and the liquid application assembly 36 are held by a liquid application frame 31*a* and a base 48.

The lower pressure plate 33 and the upper pressure plate 34 are disposed downstream from the internal tray 22 in the conveyance direction. The lower pressure plate 33 supports, from below, the sheet P or the sheet bundle Pb placed on the internal tray 22. The lower pressure plate 33 is disposed on a lower-pressure-plate holder 331. The upper pressure plate 34 can move (up and down) in the thickness direction of the sheet P above the sheet P or the sheet bundle Pb placed on the internal tray 22. In other words, the lower pressure plate 33 and the upper pressure plate 34 are disposed to face each other in the thickness direction of the sheet P or the sheet bundle Pb with the sheet bundle Pb placed on the internal tray 22 and interposed between the lower pressure plate 33 and the upper pressure plate 34. In the following description, the thickness direction of the sheet bundle Pb may be referred to simply as "thickness direction." The upper pressure plate 34 has a through hole 34*a* penetrating in the thickness direction at a position where the through hole 34*a* faces an end of a liquid application member 44 attached to a base plate 40.

The liquid applier movement assembly 35 moves the upper pressure plate 34, the base plate 40, and the liquid application member 44 in the thickness direction of the sheet P or the sheet bundle Pb. The liquid applier movement assembly 35 according to the present embodiment moves the upper pressure plate 34, the base plate 40, and the liquid application member 44 in conjunction with each other with a single liquid applier movement motor 37. The liquid applier movement assembly 35 includes, for example, the liquid applier movement motor 37, a trapezoidal screw 38, a nut 39, the base plate 40, columns 41*a* and 41*b*, and coil springs 42*a* and 42*b*.

The liquid applier movement motor 37 generates a driving force to move the upper pressure plate 34, the base plate 40, and the liquid application member 44. The trapezoidal screw 38 extends in a vertical direction in FIGS. 3 and 4 and is rotatably attached to the liquid application frame 31*a*. The trapezoidal screw 38 is coupled to an output shaft of the liquid applier movement motor 37 via, for example, a pulley and a belt. The nut 39 is screwed to the trapezoidal screw 38. The trapezoidal screw 38 is rotated by the driving force transmitted from the liquid applier movement motor 37. The rotation of the trapezoidal screw 38 moves the nut 39.

The base plate 40 is disposed above the upper pressure plate 34. The base plate 40 holds the liquid application member 44 with the end of the liquid application member 44 projecting downward. The base plate 40 is coupled to the trapezoidal screw 38 to move together with the trapezoidal screw 38. The position of the base plate 40 in the vertical direction is detected by a movement sensor 40*a* (see FIG. 7).

The columns 41*a* and 41*b* project downward from the base plate 40 around the end of the liquid application member 44. The columns 41*a* and 41*b* can move relative to the base plate 40 in the thickness direction. The columns 41*a* and 41*b* have respective lower ends holding the upper pressure plate 34. The columns 41*a* and 41*b* have respective upper ends provided with stoppers that prevent the columns 41*a* and 41*b* from being removed from the base plate 40. The coil springs 42*a* and 42*b* are fitted around the columns 41*a* and 41*b*, respectively, between the base plate 40 and the upper pressure plate 34. The coil springs 42*a* and 42*b* bias the upper pressure plate 34 and the columns 41*a* and 41*b* downward with respect to the base plate 40.

The liquid application assembly 36 applies liquid to the sheet P or the sheet bundle Pb at a predetermined liquid application position with respect to the sheet P or the sheet bundle Pb placed on the internal tray 22. Specifically, the liquid application assembly 36 brings the end of the liquid application member 44 into contact with the liquid application position of the sheet P or the sheet bundle Pb to apply the liquid to at least one sheet P of the sheet bundle Pb. The liquid application assembly 36 includes the liquid storage tank 43, the liquid application member 44, a supplier 45, and a joint 46.

The liquid storage tank 43 stores the liquid to be supplied to the sheet P or the sheet bundle Pb. The amount of liquid that is stored in the liquid storage tank 43 is detected by a liquid amount sensor 43*a*. The liquid application member 44 supplies the liquid stored in the liquid storage tank 43 to the sheet P or the sheet bundle Pb. The liquid application member 44 is held by the base plate 40 with the end of the liquid application member 44 facing downward. The liquid application member 44 is made of a material having a relatively high liquid absorption (for example, sponge or fiber).

The supplier 45 is an elongated member having a base end immersed in the liquid stored in the liquid storage tank 43 and another end coupled to the liquid application member 44. Like the liquid application member 44, for example, the supplier 45 is made of a material having a relatively high liquid absorption. Accordingly, the liquid absorbed from the base end of the supplier 45 is supplied to the liquid application member 44 by capillary action.

A protector 45*a* is an elongated cylindrical body (for example, a tube) that is fitted around the supplier 45. The protector 45*a* prevents the liquid absorbed by the supplier 45 from leaking or evaporating. Each of the supplier 45 and the protector 45*a* is made of a flexible material. The joint 46 fixes the liquid application member 44 to the base plate 40. Accordingly, the liquid application member 44 keeps projecting downward from the base plate 40 with the end of the liquid application member 44 facing downward when the liquid application member 44 is moved by the liquid applier movement assembly 35.

The crimper 32 presses and deforms the sheet bundle Pb with serrate binding teeth 32*a* and 32*b* to bind the sheet bundle Pb. In short, the crimper 32 binds the sheet bundle Pb without staples. The components of the crimper 32 such as the binding teeth 32*a*, which may be referred to as upper crimping teeth 32*a*, and the binding teeth 32*b*, which may be referred to as lower crimping teeth 32*b*, are disposed on a crimping frame 32*c*. In the following description, such a way of pressing and deforming a given position on the sheet bundle Pb to bind the sheet bundle Pb may be referred to as "crimp binding." In other words, the crimper 32 crimps and binds the sheet bundle Pb or performs the crimp binding on the sheet bundle Pb.

As illustrated in FIGS. 3 and 4, the lower pressure plate 33 is provided with a temperature-and-humidity sensor 60 that measures the temperature and humidity around the position where the liquid application process is performed. The mount position of the temperature-and-humidity sensor 60 is not limited to the lower pressure plate 33, and may be any position as long as the temperature-and-humidity sensor 60 can measure the temperature and humidity that affect the binding strength of the sheet bundle Pb when the liquid application process is performed on the sheets P.

Now, a description is given of the configuration of the crimper 32.

Figure 5A:
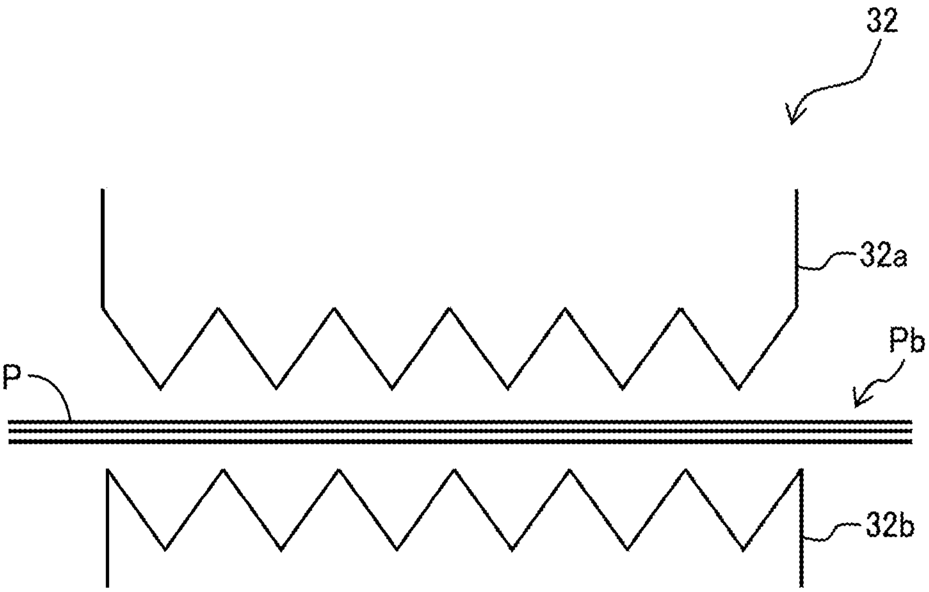
FIGS. 5A and 5B are schematic diagrams illustrating a configuration of a crimper according to an embodiment of the present disclosure.
Figure 5B:

FIGS. 5A and 5B are schematic diagrams illustrating a configuration of the crimper 32. As illustrated in FIGS. 5A and 5B, the crimper 32 includes the binding teeth 32*a* and the binding teeth 32*b* in pair, which may be referred to as a pair of binding teeth 32*a* and 32*b* in the following description. The binding teeth 32*a* and the binding teeth 32*b* are disposed to face each other in the thickness direction of the sheet bundle Pb with the sheet bundle Pb placed on the internal tray 22 and interposed between the binding teeth 32*a* and the binding teeth 32*b*. The binding teeth 32*a* and the binding teeth 32*b* have respective serrate faces facing each other. The serrate face of each of the binding teeth 32*a* and the binding teeth 32*b* includes concave portions and convex portions alternately formed. The concave portions and the convex portions of the binding teeth 32*a* are shifted from those of the binding teeth 32*b* such that the binding teeth 32*a* are engaged with the binding teeth 32*b*. The binding teeth 32*a* and the binding teeth 32*b* are brought into contact with and separated from each other by a driving force of a contact-separation motor 32*d* illustrated in FIG. 7.

In a process in which the sheets P of the sheet bundle Pb are supplied to the internal tray 22, the binding teeth 32*a* and the binding teeth 32*b* are apart from each other as illustrated in FIG. 5A. When all the sheets P of the sheet bundle Pb are placed on the internal tray 22, the binding teeth 32*a* and the binding teeth 32*b* are engaged with each other to press and deform the sheet bundle Pb in the thickness direction as illustrated in FIG. 5B. As a result, the sheet bundle Pb that has been placed on the internal tray 22 is crimped and bound. The sheet bundle Pb thus crimped and bound is output to the output tray 26 by the conveyance roller pair 15.

The configuration of the crimper 32 as a crimping assembly is not limited to the configuration of the present embodiment and may be any other configuration in which the binding teeth 32*a* and the binding teeth 32*b* of the crimping assembly are engaged with each other. The crimping assembly may be a crimping assembly disclosed in Japanese Patent No. 6057167 or its corresponding U.S. Patent Application Publication No. 2014-0219747, which is hereby incorporated by reference as though disclosed herein in its entirety. In this case, the crimping assembly brings the binding teeth 32*a* and the binding teeth 32*b* into contact with each other and separate the binding teeth 32*a* and the binding teeth 32*b* form each other with a link assembly and a driving source that simply rotates forward or that rotates forward and backward. Alternatively, the crimping assembly may employ a linear motion system to linearly bring the binding teeth 32*a* and the binding teeth 32*b* into contact with each other and separate the binding teeth 32*a* and the binding teeth 32*b* from each other with a screw assembly that converts the rotational motion of a driving source into linear motion.

As illustrated in FIG. 3, the edge binder 25 includes an edge binder movement assembly 47. The edge binder movement assembly 47 moves the edge binder 25, specifically, the liquid applier 31 and the crimper 32, in the main scanning direction along a downstream end in the conveyance direction of the sheet P placed on the internal tray 22. The edge binder movement assembly 47 includes, for example, the base 48, a guide shaft 49, an edge binder movement motor 50, and a position sensor 51.

The liquid applier 31 and the crimper 32 are attached to the base 48 such that the liquid applier 31 and the crimper 32 are adjacent to each other in the main scanning direction. The guide shaft 49 extends in the main scanning direction at a position downstream from the internal tray 22 in the conveyance direction of the sheet P. The guide shaft 49 holds the base 48 slidably in the main scanning direction. The edge binder movement motor 50 generates a driving force to move the edge binder 25. The driving force of the edge binder movement motor 50 is transmitted to the base 48 via a pulley and a timing belt.

As a result, the liquid applier 31 and the crimper 32 integrated by the base 48 move in the main scanning direction along the guide shaft 49. The positions of the liquid applier 31 and the crimper 32 may be ascertained with, for example, an encoder sensor attached to an output shaft of the edge binder movement motor 50. The position sensor 51 detects the arrival of the edge binder 25 at a standby position HP illustrated in FIG. 6A.

As illustrated in FIG. 3, the edge binder 25 includes a pivot assembly 52. The pivot assembly 52 pivots each of the pair of binding teeth 32*a* and 32*b* and the liquid application member 44 about a crimper pivot 54 extending in the thickness direction of the sheet P or the sheet bundle Pb placed on the internal tray 22. The thickness direction of the sheet P of the sheet bundle Pb is the direction orthogonal to the conveyance direction and to the main scanning direction. The pivot assembly 52 includes a liquid applier pivot 53, the crimper pivot 54, a coupling assembly 55, and a pivot motor 56 serving as a driving source.

The liquid applier pivot 53 and the crimper pivot 54 extend in the thickness direction of the sheet P or the sheet bundle Pb placed on the internal tray 22. In other words, the liquid applier pivot 53 and the crimper pivot 54 extend parallel to each other at positions apart from each other in the main scanning direction. The liquid applier pivot 53 supports the liquid application member 44 pivotably with respect to the liquid application frame 31*a*. The crimper pivot 54 supports the crimping frame 32*c* pivotably with respect to the base 48. The coupling assembly 55 couples the crimping frame 32*c* and the liquid applier pivot 53 to each other.

The pivot motor 56 generates a driving force to pivot the pair of binding teeth 32*a* and 32*b* and the liquid application member 44. The driving force of the pivot motor 56 is transmitted to the crimper pivot 54 via a pulley and a timing belt. As a result, the crimping frame 32*c* is pivoted about the crimper pivot 54 together with the pair of binding teeth 32*a* and 32*b*. The rotation of the crimping frame 32*c* is transmitted to the liquid applier pivot 53 via the coupling assembly 55. As a result, the liquid application member 44 is pivoted about the liquid applier pivot 53 with respect to the liquid application frame 31*a*.

Now, a description is given of the movement of the edge binder 25 in the main scanning direction.

Figure 6C:
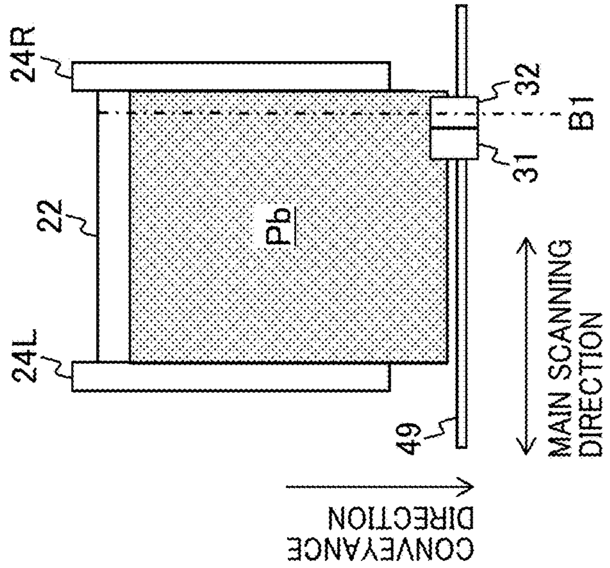
FIGS. 6A to 6C are diagrams illustrating the positions of the liquid applier and the crimper during a binding process.
Figure 6B:
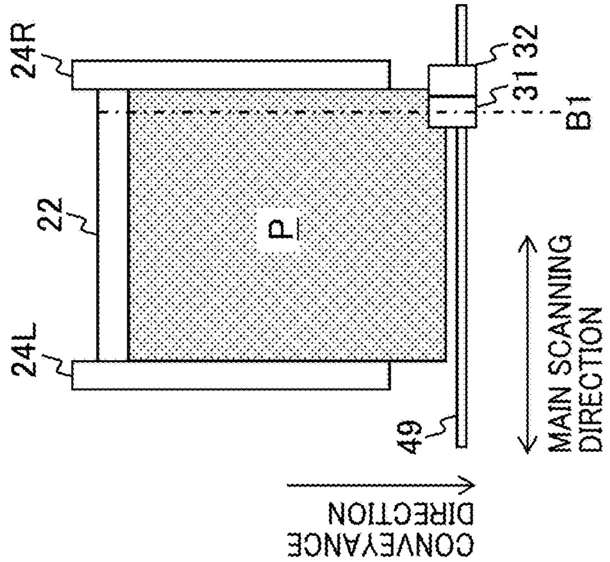
Figure 6A:
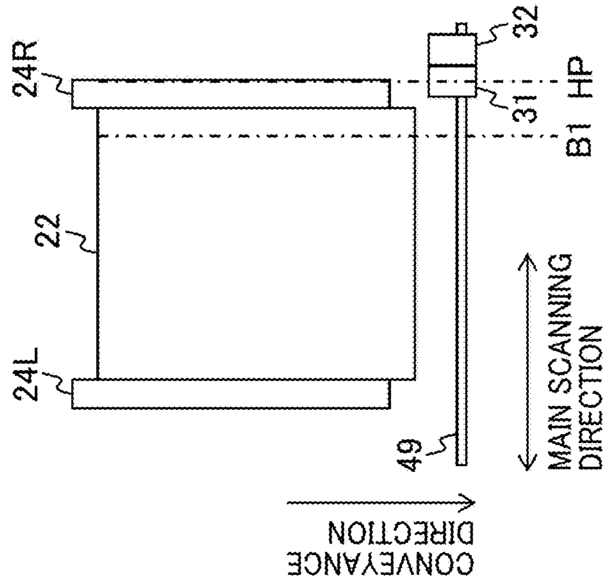

Specifically, with reference to FIGS. 6A to 6C, a description is now given of a moving mode, in the main scanning direction, of the liquid applier 31 and the crimper 32 integrated by the base 48. As illustrated in FIG. 6A, the standby position HP is away in the width direction from the sheet P or the sheet bundle Pb placed on the internal tray 22. As illustrated in FIGS. 6B and 6C, the liquid applier 31 and the crimper 32 are moved to a binding position B1 by the edge binder movement assembly 47. At the binding position B1, the liquid applier 31 faces the sheet P or the sheet bundle Pb placed on the internal tray 22 to perform the liquid application whereas the crimper 32 faces the sheet P or the sheet bundle Pb placed on the internal tray 22 to perform the crimp binding. In other words, the standby position HP and the binding position B1 are apart from each other in the main scanning direction. The liquid applier 31 according to the present embodiment is adjacent to the crimper 32 and closer to the binding position B1 than the crimper 32 at the standby position HP.

The liquid applier 31 can be moved in the main scanning direction together with the crimper 32 by a driving force transmitted from the edge binder movement motor 50. A liquid application position to which the liquid is applied on the sheet P or the sheet bundle Pb by the liquid applier 31 corresponds to the binding position at which the sheet P or the sheet bundle Pb is to be crimped and bound by the crimper 32. For this reason, in the following description, the liquid application position and the binding position are denoted by the same reference numeral.

Referring back to FIG. 2, the post-processing apparatus 3 further includes an end fence 27, a saddle binder 28, a sheet folding blade 29, and the output tray 30. The end fence 27, the saddle binder 28, and the sheet folding blade 29 perform the saddle stitching on the sheet bundle Pb constructed of the sheets P that are conveyed through the third conveyance passage Ph3. Among the sheets P supplied from the image forming apparatus 2, the sheet bundle Pb subjected to the saddle stitching is output to the output tray 30.

The end fence 27 aligns the positions of the sheets P that are sequentially conveyed through the third conveyance passage Ph3, in a direction in which the sheets P are conveyed. The end fence 27 can move between a binding position where the end fence 27 causes the center of the sheet bundle Pb to face the saddle binder 28 and a folding position where the end fence 27 causes the center of the sheet bundle Pb to face the sheet folding blade 29. The saddle binder 28 binds the center of the sheet bundle Pb aligned by the end fence 27 at the binding position. The sheet folding blade 29 folds, in half, the sheet bundle Pb placed on the end fence 27 at the folding position and causes the conveyance roller pair 18 to sandwich the sheet bundle Pb. The conveyance roller pairs 18 and 19 output the sheet bundle Pb subjected to the saddle stitching to the output tray 30.

Now, a description is given of a hardware control configuration of the post-processing apparatus 3.

Figure 7:
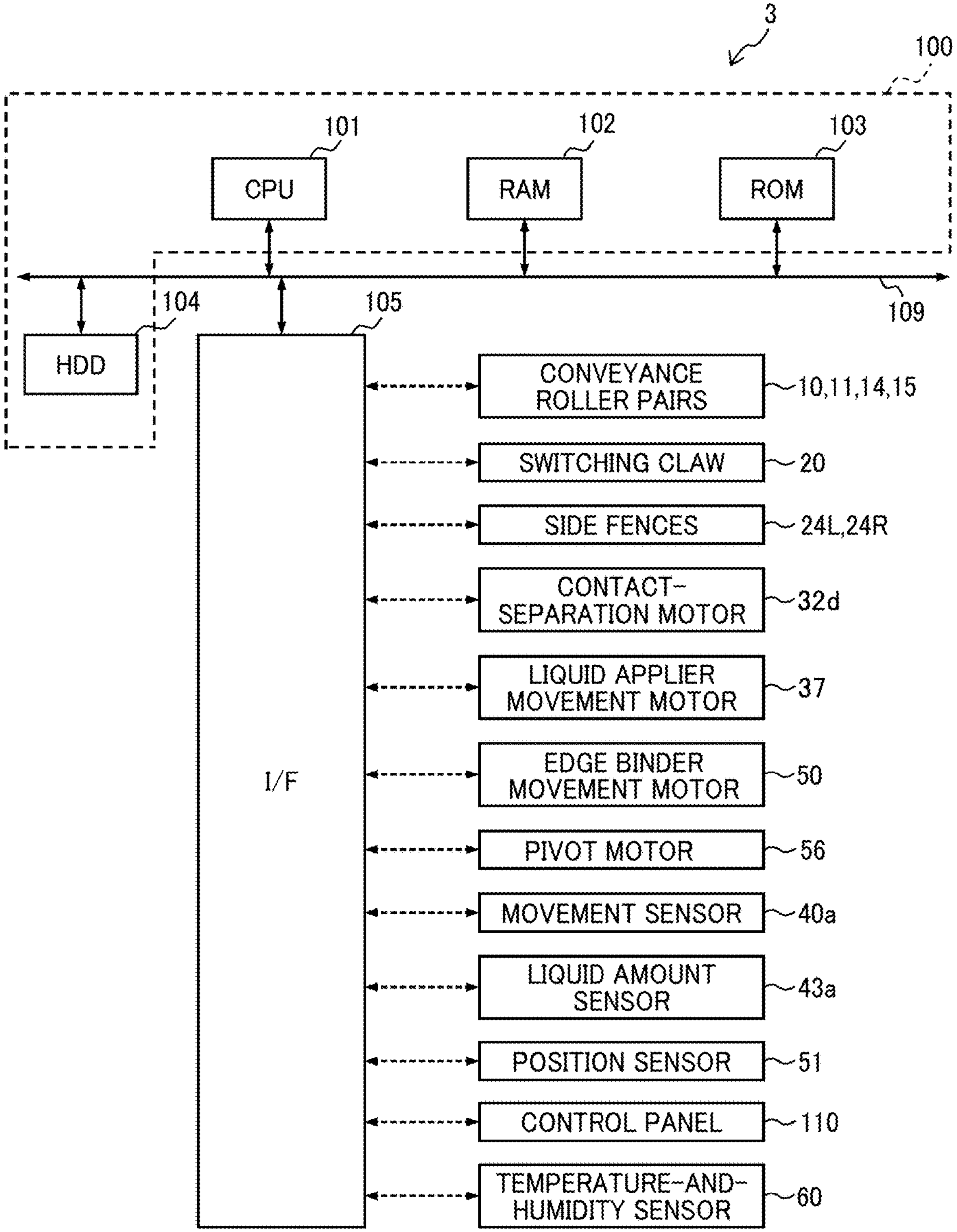
FIG. 7 is a block diagram illustrating a hardware configuration of the post-processing apparatus of FIG. 2 to control the operation of the post-processing apparatus.

FIG. 7 is a diagram illustrating a hardware configuration of the post-processing apparatus 3 in the control configuration of the post-processing apparatus 3 according to the first embodiment of the present disclosure. As illustrated in FIG. 7, the post-processing apparatus 3 includes a central processing unit (CPU) 101, a random access memory (RAM) 102, a read only memory (ROM) 103, a hard disk drive (HDD) 104, and an interface (I/F) 105. The CPU 101, the RAM 102, the ROM 103, the HDD 104, and the I/F 105 are connected to each other via a common bus 109.

The CPU 101 is an arithmetic unit and controls the overall operation of the post-processing apparatus 3. The RAM 102 is a volatile storage medium that allows data to be read and written at high speed. The CPU 101 uses the RAM 102 as a working area for data processing. The ROM 103 is a read-only non-volatile storage medium that stores programs such as firmware. The HDD 104 is a non-volatile storage medium that allows data to be read and written and has a relatively large storage capacity. The HDD 104 stores, e.g., an operating system (OS), various control programs, and application programs.

By an arithmetic function of the CPU 101, the post-processing apparatus 3 processes, for example, a control program stored in the ROM 103 and an information processing program (application program) loaded into the RAM 102 from a storage medium such as the HDD 104. Such processing configures a software controller including various functional modules of the post-processing apparatus 3. The software controller thus configured cooperates with hardware resources of the post-processing apparatus 3 to construct functional blocks that implement functions of the post-processing apparatus 3. In other words, the CPU 101, the RAM 102, the ROM 103, and the HDD 104 construct a controller 100 that controls the operation of the post-processing apparatus 3.

The I/F 105 is an interface that connects the conveyance roller pairs 10, 11, 14, and 15, the switching claw 20, the side fences 24L and 24R, the contact-separation motor 32*d*, the liquid applier movement motor 37, the edge binder movement motor 50, the pivot motor 56, the movement sensor 40*a*, the liquid amount sensor 43*a*, the position sensor 51, a control panel 110, and the temperature-and-humidity sensor 60 to the common bus 109. The controller 100 operates, via the I/F 105, the conveyance roller pairs 10, 11, 14, and 15, the switching claw 20, the side fences 24L and 24R, the contact-separation motor 32*d*, the liquid applier movement motor 37, the edge binder movement motor 50, and the pivot motor 56 to acquire detection results provided by the movement sensor 40*a*, the liquid amount sensor 43*a*, and the position sensor 51. Although FIG. 6 illustrates the components that execute the edge stitching, the components that execute the saddle stitching are controlled by the controller 100 like the components that execute the edge stitching.

As illustrated in FIG. 1, the image forming apparatus 2 includes the control panel 110. The control panel 110 includes an operation unit that receives instructions from a user and a display serving as a notifier that notifies the user of information. The operation unit includes, for example, hard keys and a touch screen overlaid on a display. The control panel 110 acquires information from the user through the operation unit and provides information to the user through the display. Note that a specific example of the notifier is not limited to the display and may be a light emitting diode (LED) lamp or a speaker. The post-processing apparatus 3 may include the control panel 110 like the control panel 110 described above.

Next, with reference to FIGS. 8, 9A, 9B, 9C, 10A, 10C, and 10C, an edge binder 25' that is a modification of the edge binder 25 will be described. A difference of the edge binder 25' from the edge binder 25 according to the first embodiment is that the liquid applier 31 and the crimper 32 are integrated as a single unit. In the following description, components like those of the edge binder 25 according to the first embodiment are denoted by like reference numerals, and redundant descriptions thereof may be omitted.

Figure 8:
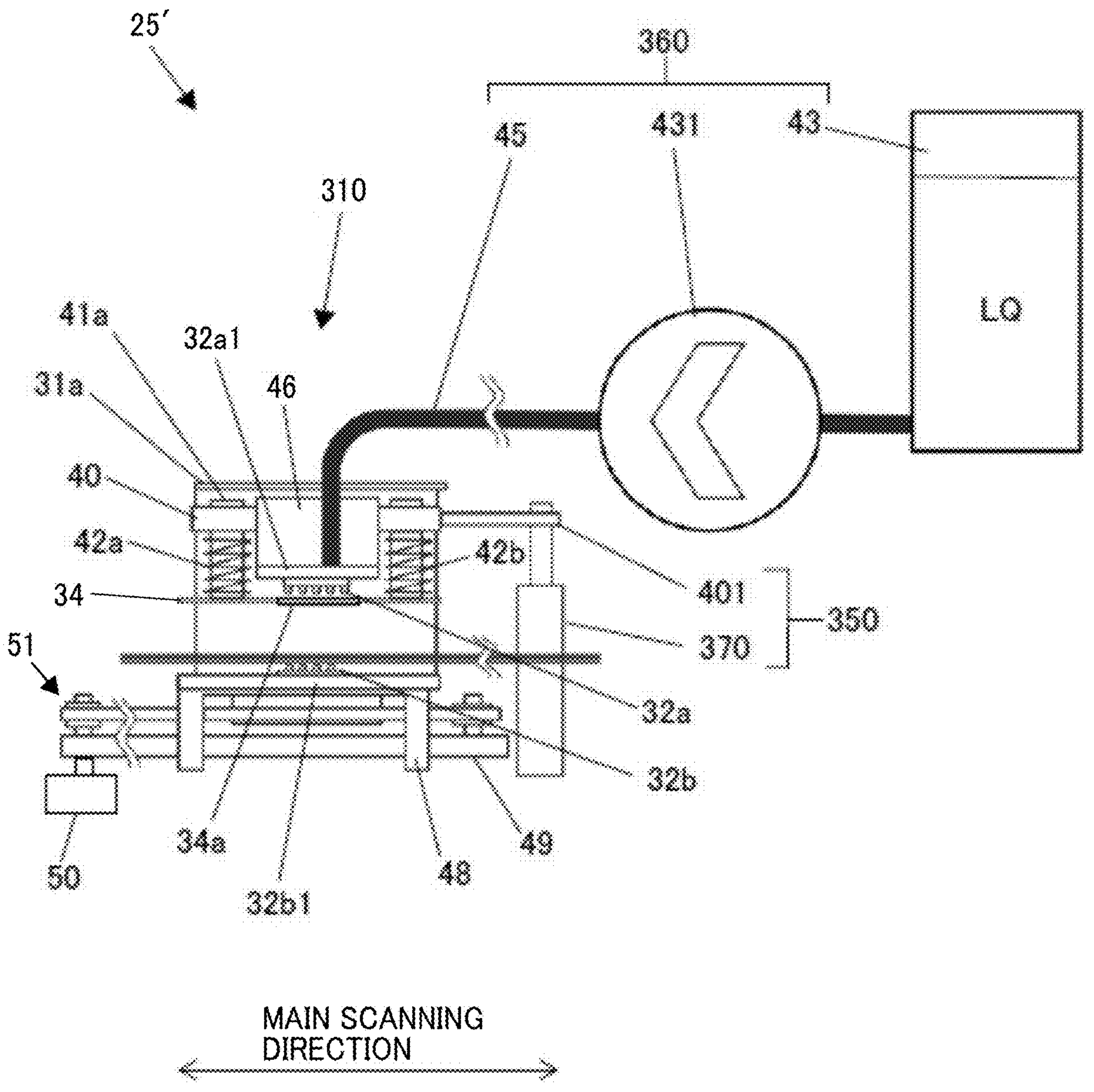
FIG. 8 is a diagram illustrating a modification of the edge binder of FIG. 3.
Figure 9A:
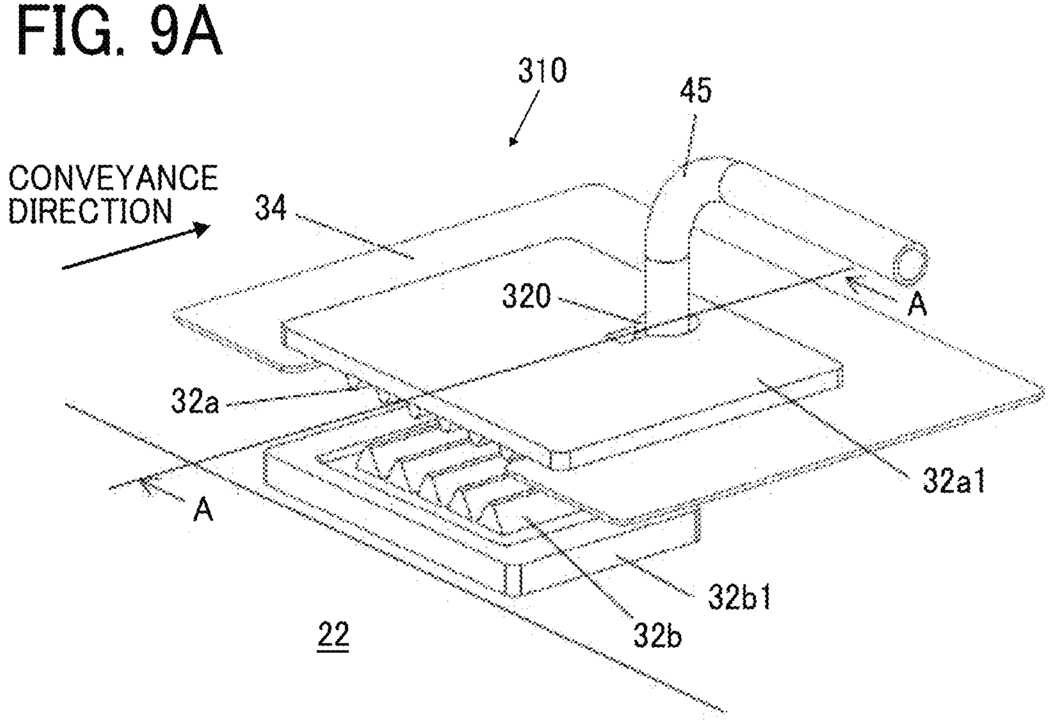
FIGS. 9A, 9B, and 9C are diagrams illustrating a liquid application crimper in the edge binder of FIG. 8.
Figure 9B:
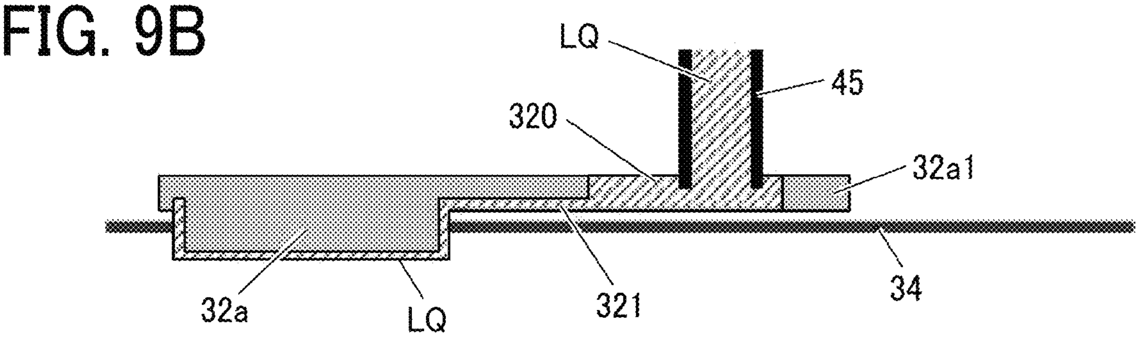
Figure 9C:
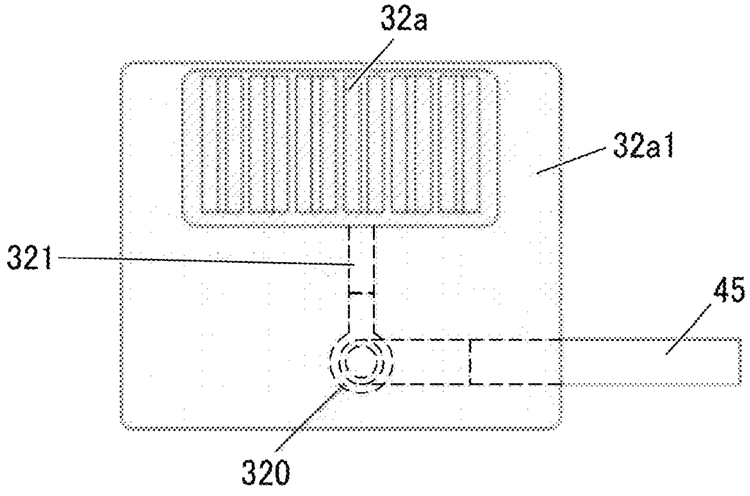

FIG. 8 is a schematic view of the edge binder 25' viewed from the upstream side in the conveyance direction. FIG. 9A is a perspective view of a liquid application crimper 310. FIG. 9B is a cross-sectional view of the liquid application crimper 310 taken along line A-A in FIG. 9A. FIG. 9C is a plan view of the upper crimping teeth 32*a* of FIG. 9A as viewed from the side at which the lower crimping teeth 32*b* is disposed. FIGS. 9A, 9B, and 9C illustrate a liquid application operation and a crimp binding operation performed by the liquid application crimper 310 and are schematic views of the liquid application crimper 310 viewed from the downstream side in the conveyance direction.

As illustrated in FIG. 8, the edge binder 25' includes a liquid application crimper 310 in which the liquid applier 31 and the crimper 32 of the edge binder 25 according to the first embodiment are integrated as a single unit. The liquid application crimper 310 is disposed downstream from the internal tray 22 in the conveyance direction.

The liquid application crimper 310 applies liquid LQ stored in the liquid storage tank 43 to a sheet P or a sheet bundle Pb placed on the internal tray 22. The liquid application crimper 310 is configured to be movable in the main scanning direction by the driving force transmitted from the edge binder movement motor 50. The liquid application crimper 310 includes the upper pressure plate 34, the upper crimping teeth 32*a*, the lower crimping teeth 32*b*, a liquid application crimper movement assembly 350, and a liquid supply assembly 360. Components of the liquid application crimper 310 are held by the liquid application frame 31*a* and the base 48.

The liquid application crimper movement assembly 350 moves the upper pressure plate 34, the base plate 40, and the upper crimping teeth 32*a* in conjunction with each other in the thickness direction of the sheet P or the sheet bundle Pb by an electric cylinder 370. The base plate 40 holds an upper crimping teeth holder 32*a*1 and the upper crimping teeth 32*a* via a joint 46. The base plate 40 movably holds the upper pressure plate 34 via the columns 41*a* and 41*b*. The base plate 40 is attached to the distal end of a rod 371 of the electric cylinder 370 via a connecter 401.

The columns 41*a* and 41*b* hold the upper pressure plate 34 at lower ends of the columns 41*a* and 41*b*. The coil springs 42*a* and 42*b* are fitted around the columns 41*a* and 41*b*, respectively, between the base plate 40 and the upper pressure plate 34. The coil springs 42*a* and 42*b* bias the upper pressure plate 34 and the columns 41*a* and 41*b* downward with respect to the base plate 40.

The liquid supply assembly 360 includes a liquid storage tank 43, a supply pump 431, and a supplier 45. The supply pump 431 feeds the liquid LQ via the supplier 45 to a liquid reservoir 320 of the upper crimping teeth holder 32*a*1 as illustrated in FIG. 9A. The supplier 45 has a proximal end connected to the supply pump 431 and a distal end connected to the liquid reservoir 320, and is formed of an elastic elongated member.

As illustrated in FIG. 9B, the upper crimping teeth 32*a* are integrated with the upper crimping teeth holder 32*a*1. The upper crimping teeth holder 32*a*1 is provided with the liquid reservoir 320 and a liquid supply path 321 for supplying the liquid LQ stored in the liquid reservoir 320 to the upper crimping teeth 32*a*. The surfaces of the upper crimping teeth 32*a* are subjected to a hydrophilic treatment so that the liquid LQ supplied from the liquid supply path 321 uniformly spreads over the surfaces of the upper crimping teeth 32*a*. On the other hand, the portions of the upper crimping teeth holder 32*a*1 other than the upper crimping teeth 32*a* are subjected to a hydrophobic treatment so that the liquid LQ efficiently spreads over the surfaces of the upper crimping teeth 32*a*.

As illustrated in FIG. 8, the lower crimping teeth 32*b* are integrated with the lower crimping teeth holder 32*b*1 as a single unit and are mounted on the base 48 via the lower crimping teeth holder 32*b*1.

Figure 10A:
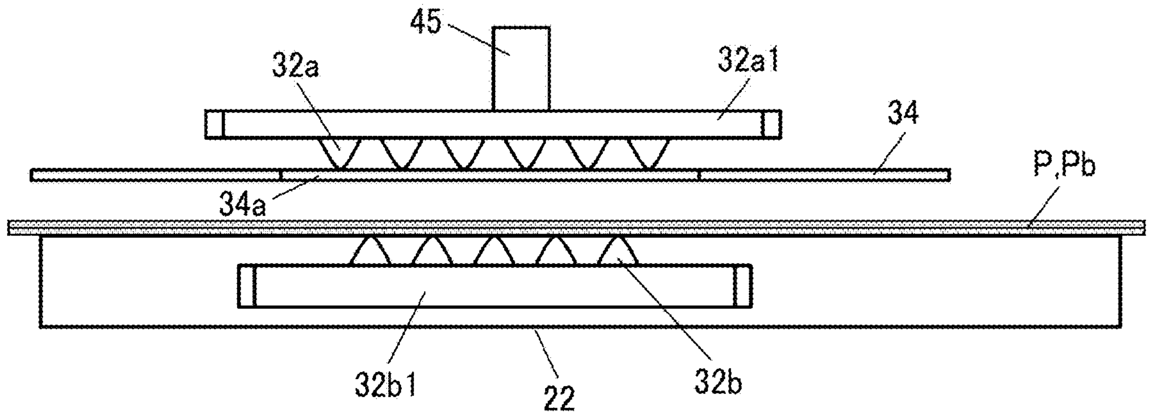
FIGS. 10A, 10B, and 10C are diagrams illustrating a liquid applying operation and a crimp binding operation by the liquid application crimper of FIGS. 9A to 9C.
Figure 10B:
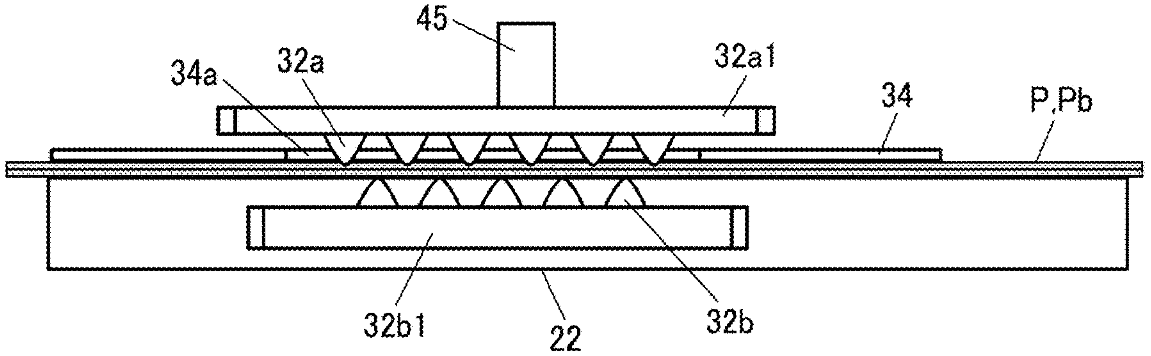
Figure 10C:
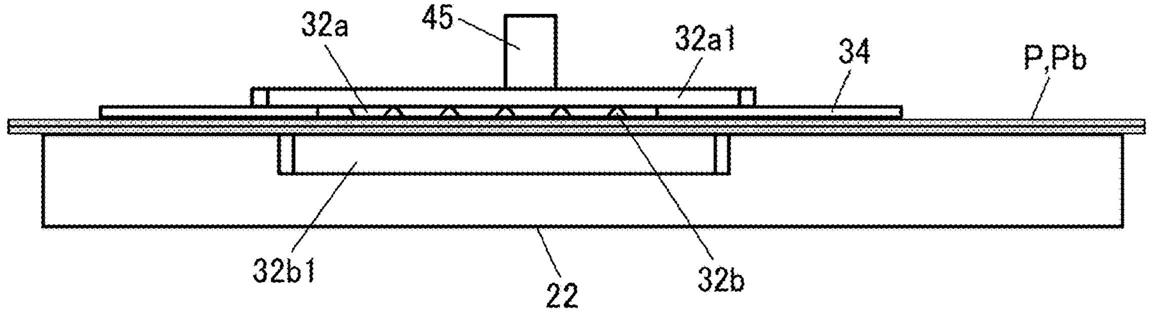

Next, the liquid application operation and the crimp binding operation by the liquid application crimper 310 will be described with reference to FIGS. 10A, 10B, and 10C. In the process of supplying a sheet P to the internal tray 22, as illustrated in FIG. 10A, the upper crimping teeth 32*a* and the lower crimping teeth 32*b* are separated from each other. When the sheet P is placed on the internal tray 22, the electric cylinder 370 is contracted to move the upper crimping teeth 32*a* and the upper pressure plate 34 toward the sheet P. Then, as illustrated in FIG. 10B, the upper pressure plate 34 first comes into contact with the sheet P, and then the upper crimping teeth 32*a* pass through the through-hole 34*a* of the upper pressure plate 34 and come into contact with the sheet P. At this time, since the liquid LQ is spread over the surfaces of the upper crimping teeth 32*a*, bringing the upper crimping teeth 32*a* into contact with the sheet P allows the liquid to be applied to the liquid application position on the sheet P. When liquid application to the liquid application position is completed, the electric cylinder 370 is extended to separate the upper crimping teeth 32*a* and the upper pressure plate 34 from the sheet P. The above-described contact and separation operation (liquid application operation) of the upper crimping teeth 32*a* and the upper pressure plate 34 with respect to the sheets P is repeatedly performed on sheets P of the sheet bundle Pb.

When the sheet bundle Pb including a predetermined number of sheets P is placed on the internal tray 22, the electric cylinder 370 is further contracted to move the upper crimping teeth 32*a* toward the lower crimping teeth 32*b*. Then, as illustrated in FIG. 10C, in a state in which the sheet bundle Pb is sandwiched between the upper crimping teeth 32*a* and the lower crimping teeth 32*b*, the upper crimping teeth 32*a* further moves toward the lower crimping teeth 32*b*. Thus, the upper crimping teeth 32*a* and the lower crimping teeth 32*b* press and deform the sheet bundle Pb to crimp and bind the sheet bundle Pb (crimp binding operation).

Now, a description is given of a flowchart of the crimp binding process.

Figure 11:
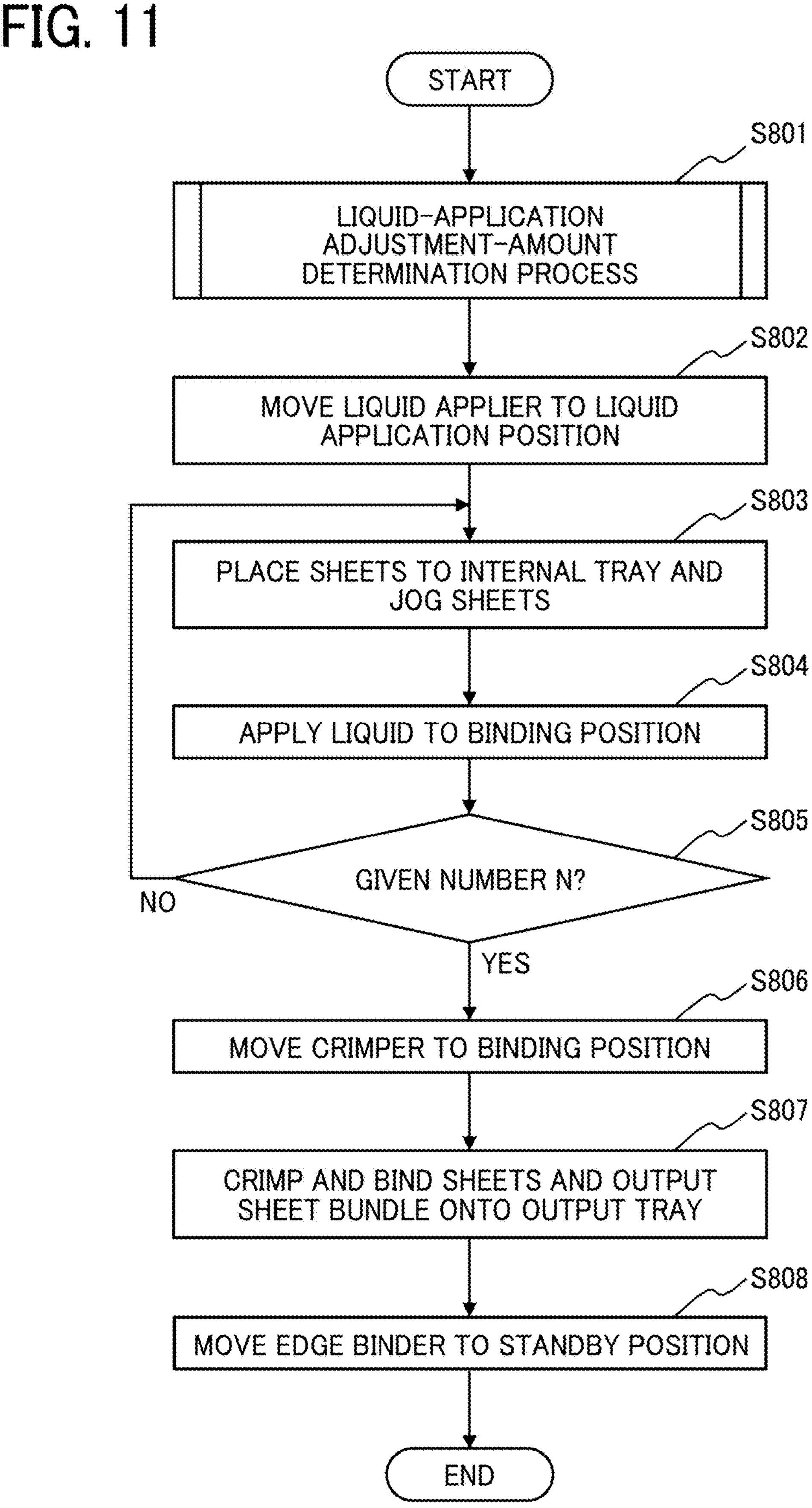
FIG. 11 is a flowchart of a binding process.

FIG. 11 is a flowchart of a binding process implemented by control processing executed by the controller 100. The controller 100 starts the binding process illustrated in FIG. 11, for example, when the controller 100 acquires an instruction to execute the binding process from the image forming apparatus 2. Hereinafter, the instruction to execute the binding process may be referred to as a "binding command."

The binding command includes, for example, the number of sheets P of the sheet bundle Pb, the number of sheet bundles Pb to be bound, the binding position on the sheet bundle Pb, and a binding posture of the edge binder 25. In the following description, the number of sheets P of the sheet bundle Pb may be referred to as "given number of sheets" or "given number N" whereas the number of sheet bundles Pb to be bound may be referred to as "requested number of copies."

Examples of the binding command further include environmental conditions such as the fixing temperature Pt in the image forming process executed in the image forming apparatus 2 and information indicating the conveyance distance L to the edge binder 25. Such environmental conditions include factors that may have an adverse effect on obtaining a predetermined binding strength in a case where the liquid application process performed later in the edge binder 25 is performed with a predetermined amount of applied liquid and crimp binding is performed. That is, the environmental conditions included in the binding command may affect the binding strength when the medium is subjected to the binding process by the liquid application and may be variation factors of the binding strength.

The liquid applier 31 and the crimper 32 are at the standby position HP at the start of the binding process. As described above, the standby position HP is away in the width direction from the sheet P or the sheet bundle Pb placed on the internal tray 22 as illustrated in FIG. 6A.

When the edge binder 25 is positioned at the standby position HP, the controller 100 determines the adjustment parameter of the amount of liquid to be applied, based on the acquired environmental condition (S801). A detailed description is given later of a process to determine the adjustment parameter of the amount of liquid to be applied by the liquid application member 44.

Subsequently, in step S802, before the sheet P is supplied to the internal tray 22, the controller 100 drives the edge binder movement motor 50 to move the edge binder 25 in the main scanning direction so that the liquid applier 31 can face the binding position B1 indicated by the binding command.

Subsequently, in step S803, the controller 100 rotates the conveyance roller pairs 10, 11, 14, and 15 to accommodate the sheet P on which an image is formed by the image forming apparatus 2 in the internal tray 22 while the liquid applier 31 is positioned to face the binding position B1 as illustrated in FIG. 6B. In addition, in step S803, the controller 100 moves the side fences 24L and 24R to align the position of the sheet P or the sheet bundle Pb placed on the internal tray 22 in the main scanning direction. In short, the controller 100 performs so-called jogging.

Subsequently, in step S804, the controller 100 causes the liquid applier 31 to apply liquid to the binding position B1 on the sheet P, which has been placed on the internal tray 22 in step S802 immediately before step S804, based on the adjustment amount determined in step S802. In other words, the controller 100 controls the driving of the liquid applier movement motor 37, based on the adjustment amount, to cause the liquid application member 44 to contact the binding position B1 on the sheet P placed on the internal tray 22.

Subsequently, in step S805, the controller 100 determines whether the number of sheets P that are placed on the internal tray 22 has reached the given number N instructed by the binding command. When the controller 100 determines that the number of sheets P placed on the internal tray 22 has not reached the given number N of sheets (NO in step S805), the controller 100 executes the processing of steps S803 and S804 again.

In other words, the controller 100 executes the operations of steps S803 and S804 each time the sheet P is conveyed to the internal tray 22 by the conveyance roller pairs 10, 11, 14, and 15. Note that the liquid may be applied to some sheets P or all the sheets P of the sheet bundle Pb. For example, the controller 100 may cause the liquid applier 31 to apply the liquid to the binding position B1 at intervals of one in every "n" sheets. Note that "n" is less than "N" (i.e., n<N).

By contrast, when the controller 100 determines that the number of sheets P that are placed on the internal tray 22 has reached the given number N (YES in step S805), in step S806, the controller 100 drives the edge binder movement motor 50 as illustrated in FIG. 6C. Thus, in step S806, the controller 100 causes the edge binder 25 to move in the main scanning direction so that the crimper 32 faces the binding position B1 as illustrated in FIG. 6C.

Subsequently, in step S807, the controller 100 crimps and binds the sheet bundle Pb placed on the internal tray 22 and outputs the sheet bundle Pb to the output tray 26. Specifically, the controller 100 drives the contact-separation motor 32*d* to cause the pair of binding teeth 32*a* and 32*b* to sandwich the binding position B1 on the sheet bundle Pb placed on the internal tray 22. The controller 100 then rotates the conveyance roller pair 15 to output the sheet bundle Pb thus crimped and bound to the output tray 26.

Subsequently, in step S808, the controller 100 drives the edge binder movement motor 50 to move the edge binder 25 to the standby position HP.

The sheets that are placed on the internal tray 22 have a crimping area sandwiched by the pair of binding teeth 32*a* and 32*b* in step S806. The crimping area overlaps a liquid application area contacted by an end face of the liquid application member 44 in step S803. In other words, the crimper 32 crimps and binds an inside of an area to which the liquid is applied by the liquid applier 31 on the sheet bundle Pb placed on the internal tray 22.

Below, a description is given of a first example of the liquid-application adjustment-amount determination process.

Figure 12:
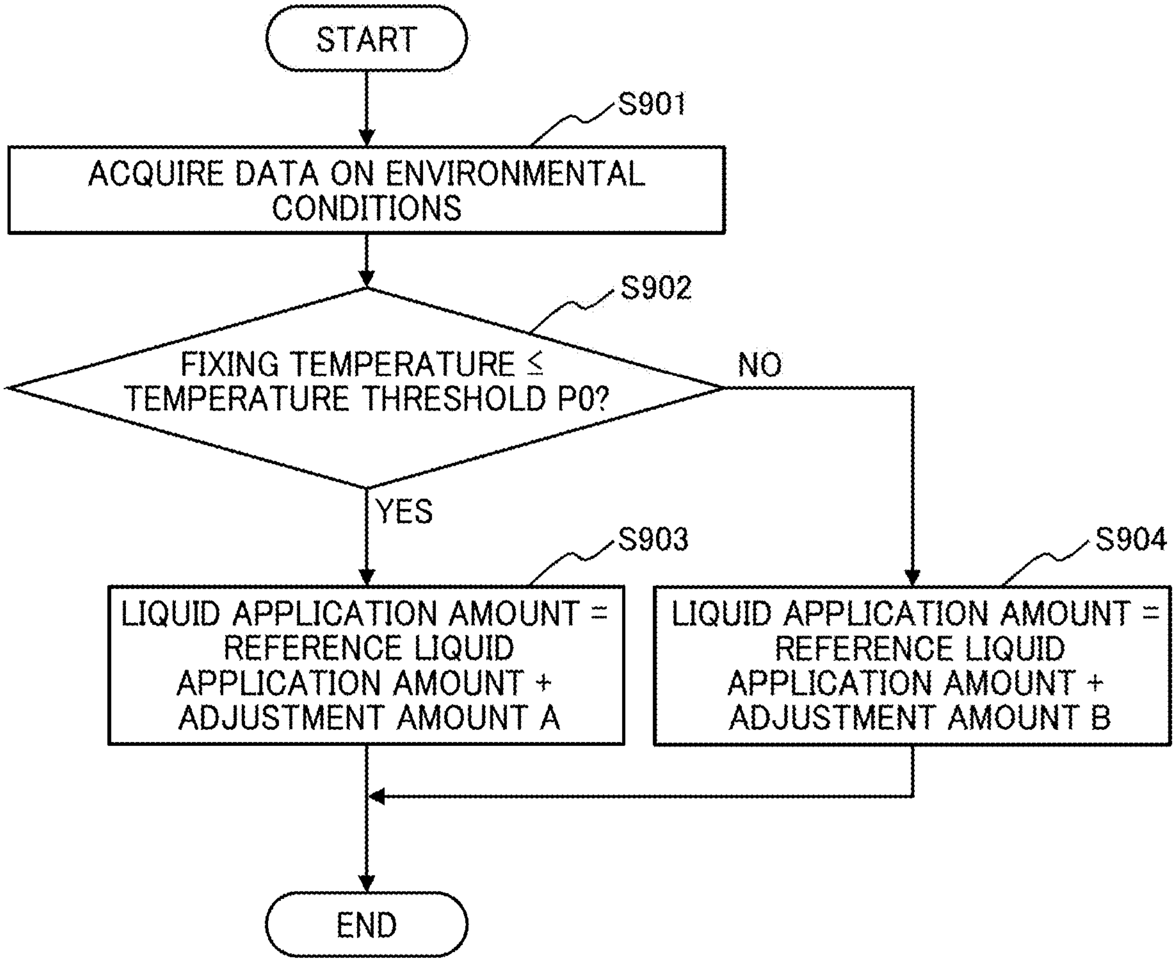
FIG. 12 is a flowchart of a first example of liquid-application adjustment-amount determination process.

With reference to the flowchart of FIG. 12, a description is given below of a detailed procedure of the first example of the liquid-application adjustment-amount determination process in step S801. The liquid-application adjustment-amount determination process is a process of determining an adjustment amount (adjustment parameter) for adjusting the liquid application amount of the liquid to be applied to the sheet P by the liquid application member 44 from a preset value in the liquid application process (step S804 of FIG. 11) and setting the liquid application amount.

Each of the adjustment amounts illustrated in each of the embodiments described below increases or decreases, for example, an amount (lowering amount) of pressing the liquid application member 44 toward the liquid application position of the sheet P placed on the lower pressure plate 33 or a pressing time of the liquid application member 44, with respect to a preset value. Therefore, in a case where liquid application control data is configured by a value obtained by adding respective adjustment amounts, the liquid application operation based on the liquid application control data can change the behavior of the liquid application member 44 with respect to the sheet P and thus apply a suitable liquid application amount to the sheet P.

First, environmental condition data is acquired. In step S901, among the data included in the binding command from the image forming apparatus 2 as an external apparatus disposed on the upstream side in the conveyance direction of the sheet P, the controller 100 acquires data representing a fixing temperature for fixing an image on the sheet P in the image former 99 and indicating a temperature environment applied to the sheet P in pre-processing. The fixing temperature may be a fixing temperature at which liquid ink adhered to the sheet P is dried to fix the image.

Subsequently, in step S902, the controller 100 determines whether the acquired fixing temperature Pt is equal to or lower than a temperature reference value P0. If the fixing temperature Pt is equal to or lower than the temperature reference value P0 (YES in step S902), in step S903, the controller 100 determines, as the liquid application control data, a value obtained by adding an adjustment amount A to a reference liquid application amount as a preset amount.

If the fixing temperature Pt is higher than the temperature threshold value P0 (NO in step S902), in step S904, the controller 100 determines, as the liquid application control data, a value obtained by adding an adjustment amount B to the reference liquid application amount as the preset amount.

The controller 100 executes the liquid application process in step S804 using the liquid application control data determined as described above. The adjustment amount B is larger than the adjustment amount A, and the liquid application process based on the liquid application control data determined in step S804 has a larger liquid application amount.

Next, a description is given of a second example of the liquid-application adjustment-amount determination process.

Figure 13:
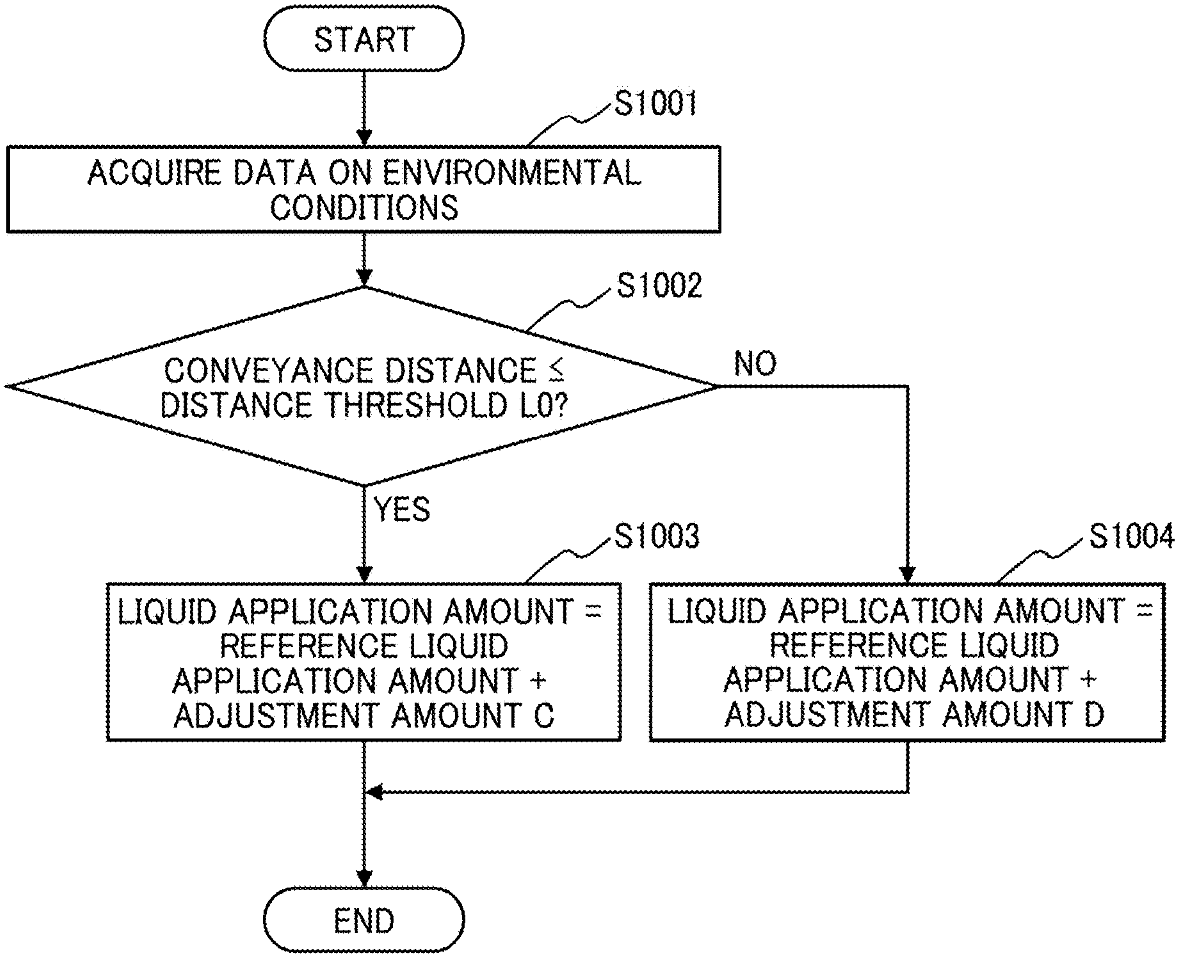
FIG. 13 is a flowchart of a second example of the liquid-application adjustment-amount determination process.

With reference to the flowchart of FIG. 13, a description is given below of a detailed procedure of the second example of the liquid-application adjustment-amount determination process in step S801. The liquid-application adjustment-amount determination process is a process of determining an adjustment value (adjustment parameter) for adjusting the liquid application amount of the liquid to be applied to the sheet P by the liquid application member 44 from a preset value (preset amount) in the liquid application process (step S804 of FIG. 11) and setting the liquid application amount.

First, environmental condition data is acquired. In step S1001, among the data included in the binding command from the image forming apparatus 2 as an external apparatus, the controller 100 acquires data representing a conveyance distance as the length of a conveyance path from the point at which an image is formed on a sheet P in the image former 99 to the edge binder 25. It is preferable to increase the amount of liquid applied to the sheet P as the conveyance distance increases.

Subsequently, in step S1002, the controller 100 determines whether the acquired conveyance distance L is equal to or lower than a distance threshold value L0. If the conveyance distance L is equal to or smaller than the distance threshold value L0 (YES in step S1002), in step S1003, the controller 100 determines, as the liquid application control amount, a value obtained by adding an adjustment amount C to the reference liquid application amount as the preset amount.

If the conveyance distance L is greater than the distance threshold value L0 (NO in step S1002), in step S1004, the controller 100 determines, as the liquid application control amount, a value obtained by adding an adjustment amount D to the reference liquid application amount as the preset amount.

The controller 100 executes the liquid application process in step S804 using the liquid application control data determined as described above. The adjustment amount D is larger than the adjustment amount C, and the liquid application process based on the liquid application control data determined in step S804 has a larger liquid application amount.

Next, a description is given of a third example of liquid-application adjustment-amount determination process.

Figure 14:
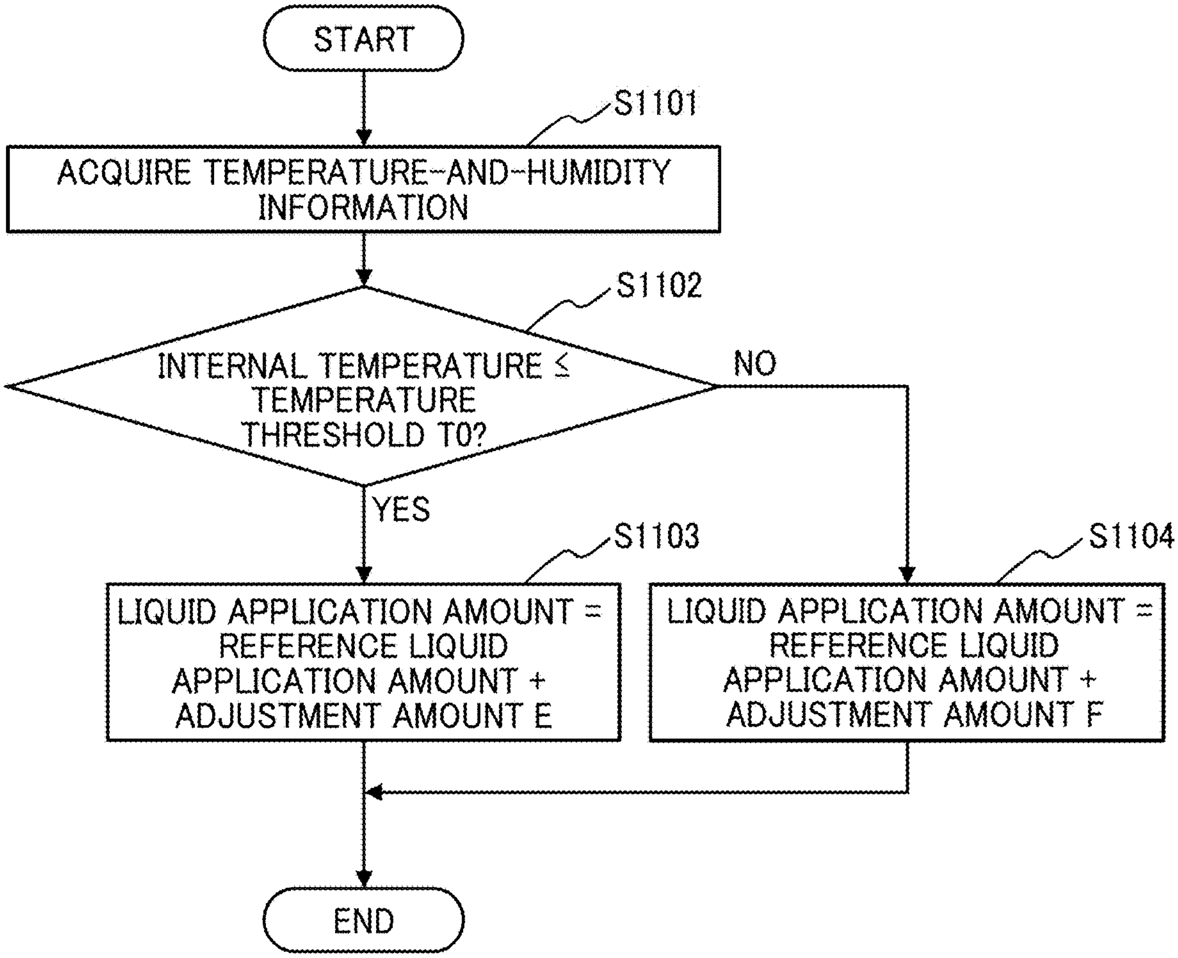
FIG. 14 is a flowchart of a third example of the liquid-application adjustment-amount determination process.

With reference to the flowchart of FIG. 14, a detailed procedure of the third example of the liquid-application adjustment-amount determination process in step S801. The liquid-application adjustment-amount determination process is a process of determining an adjustment value (adjustment parameter) for adjusting the liquid application amount of the liquid to be applied to the sheet P by the liquid application member 44 from a preset value (preset amount) in the liquid application process (step S804 of FIG. 11) and setting the liquid application amount.

First, in step S1101, the controller 100 acquires data on the temperature and humidity conditions of the environment of liquid application process from the temperature-and-humidity sensor 60. As the temperature in the environment of liquid application process increases, it is more preferable to increase the amount of liquid applied to the sheet P.

Subsequently, in step S1102, the controller 100 determines whether the internal temperature T as the acquired ambient temperature is equal to or lower than the ambient temperature threshold T0. If the internal temperature T is equal to or lower than the ambient temperature threshold T0 (YES in step S1102), in step S1103, the controller 100 determines, as the liquid application control amount, a value obtained by adding an adjustment amount E to the reference liquid application amount as the preset amount.

If the internal temperature T is greater than the ambient temperature threshold T0 (NO in step S1102), in step S1104, the controller 100 determines, as the liquid application control amount, a value obtained by adding an adjustment amount F to the reference liquid application amount as the preset amount.

The controller 100 executes the liquid application process in step S804 using the liquid application control data determined as described above. The adjustment amount F is larger than the adjustment amount E, and the liquid application process based on the liquid application control data determined in step S804 has a larger liquid application amount.

Next, a description is given of a fourth example of the liquid-application adjustment-amount determination process.

Figure 15:
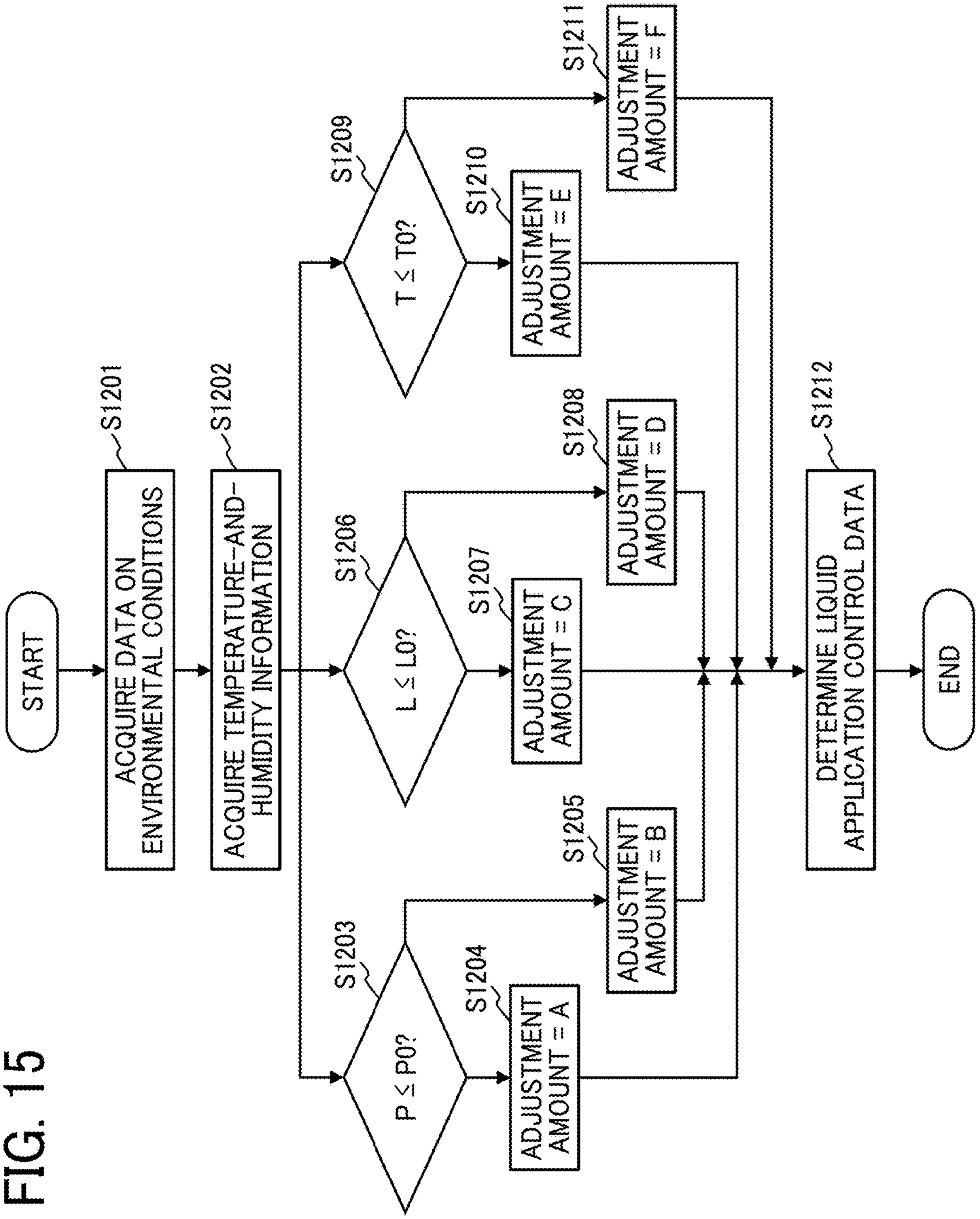
FIG. 15 is a flowchart of a fourth example of the liquid-application adjustment-amount determination process.

With reference to the flowchart of FIG. 15, a description is given below of a detailed procedure of the fourth example of the liquid-application adjustment-amount determination process in step S801. In the liquid-application adjustment-amount determination according to this example, similarly to the first to third examples described above, the controller 100 acquires data on environmental conditions (in step S1201) and acquires data on the temperature and humidity conditions of the environment of liquid application process from the temperature-and-humidity sensor 60 (in step S1202).

Subsequently, in steps S1203 to S1211, the controller 100 executes respective determination processes for the acquired data on the temperature condition, data indicating the conveyance distance, and data on the temperature and humidity conditions to determine the adjustment amounts. Since the series of processing is the same as the processing already described, the description thereof is omitted.

Subsequently, in step S1212, the controller 100 determines, as the liquid application control amount, a value obtained by adding any of the determined adjustment amounts to the reference liquid application.

The controller 100 executes the liquid application process in step S804 using the liquid application control data determined as described above. Each adjustment amount is for obtaining a liquid application amount necessary for the binding strength obtained by pressing and deforming the sheet bundle Pb by the crimp binding to satisfy the predetermined binding strength. Any of the above-described environmental conditions is a factor that affects the binding strength due to the pressing deformation of the sheet bundle Pb. Therefore, the factor corresponds to an environmental condition that is a variation factor of the effect of increasing the binding strength given to the sheet bundle Pb by the liquid application.

For this reason, in a case where a variation factor that reduces the effect of increasing the binding strength is large in any of the first embodiment to the fourth embodiment, the liquid application amount is adjusted to be larger than the preset amount. Such a configuration can enhance the binding strength by applying the liquid in various environments.

According to the above-described examples, for example, the following operational effects can be obtained.

The image forming apparatus 2 connected to the post-processing apparatus 3 can adjust an appropriate amount of applied liquid in response to any of a large number of types of sheets P and then perform the binding process by the crimp binding. Accordingly, the binding strength can be obtained in a suitable state, and the quality and stability of the binding process can be enhanced.

The conveyance distance varies depending on the system configuration of the image forming system 1. However, even if the temperature condition of the sheet P at the binding process varies due to the difference in the conveyance distance, the binding process by the crimp binding can be performed after the amount of applied liquid is adjusted to an appropriate amount. Accordingly, the binding strength can be obtained in a suitable state, and the quality and stability of the binding process can be enhanced.

In addition, even when the temperature condition of the sheet P at the binding process is different due to an increase in the temperature in the post-processing apparatus 3 such as when the continuous reading operation is performed in the post-processing apparatus 3, the binding process by the crimp binding can be performed after the amount of applied liquid is adjusted to an appropriate amount. Accordingly, the binding strength can be obtained in a suitable state, and the quality and stability of the binding process can be enhanced.

Furthermore, even if the temperature condition of the sheets P at the binding process varies with complex environmental conditions, the binding process by the crimp binding can be performed after the amount of applied liquid is adjusted to an appropriate amount. Accordingly, the binding strength can be obtained in a suitable state, and the quality and stability of the binding process can be enhanced.

Now, a description is given of a second embodiment of the present disclosure.

Specifically, with reference to FIGS. 17 to 25, a description is now given of a post-processing apparatus 3A according to the second embodiment of the present disclosure. In the following description, components like those of the first embodiment are denoted by like reference numerals, and redundant descriptions thereof may be omitted.

The post-processing apparatus 3A according to the second embodiment is different from the post-processing apparatus 3 according to the first embodiment in which the liquid applier 31 and the crimper 32 are arranged side by side. In the post-processing apparatus 3A according to the second embodiment, a liquid applier 131 is disposed alone at an upstream position in a direction in which the sheet P is conveyed. Such a configuration allows a given number of sheets P to be pre-stacked after the liquid application process and conveyed to the crimper 32 of the edge binder 25 disposed at a downstream position in the direction in which the sheet P is conveyed. Accordingly, the productivity of the binding process performed by the crimper 32 is enhanced. Since the direction in which the conveyance roller pairs 10, 11, and 14 convey the sheet P is opposite to the "conveyance direction" defined above, the direction in which the conveyance roller pairs 10, 11, and 14 convey the sheet P is defined as an "reverse conveyance direction" in the following description. A direction that is orthogonal to the opposite conveyance direction and the thickness direction of the sheet P is defined as the "main scanning direction" or the "width direction of the sheet P."

Figure 17:
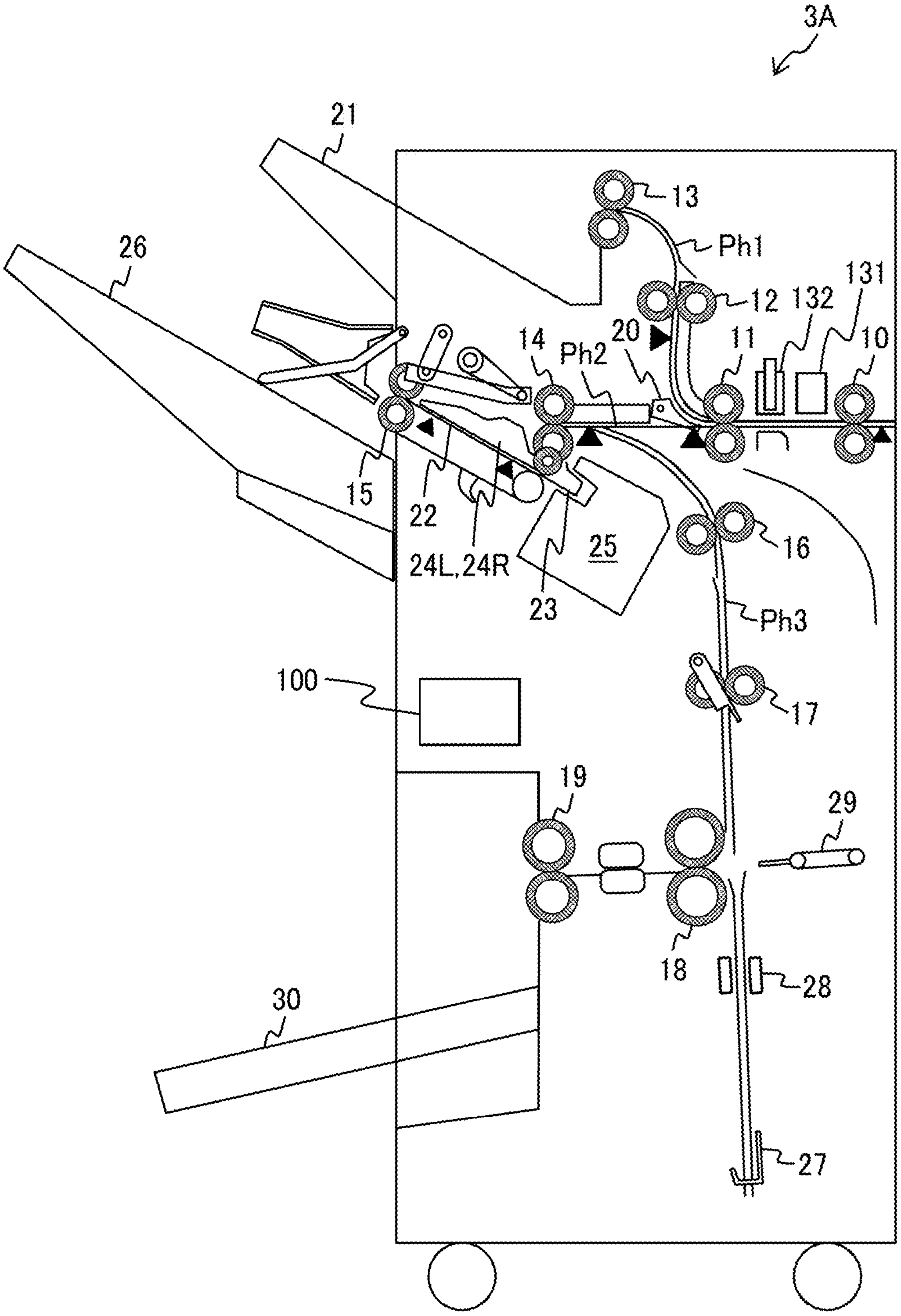
FIG. 17 is a diagram illustrating an internal configuration of a post-processing apparatus according to a second embodiment of the present disclosure.
Figure 18A:
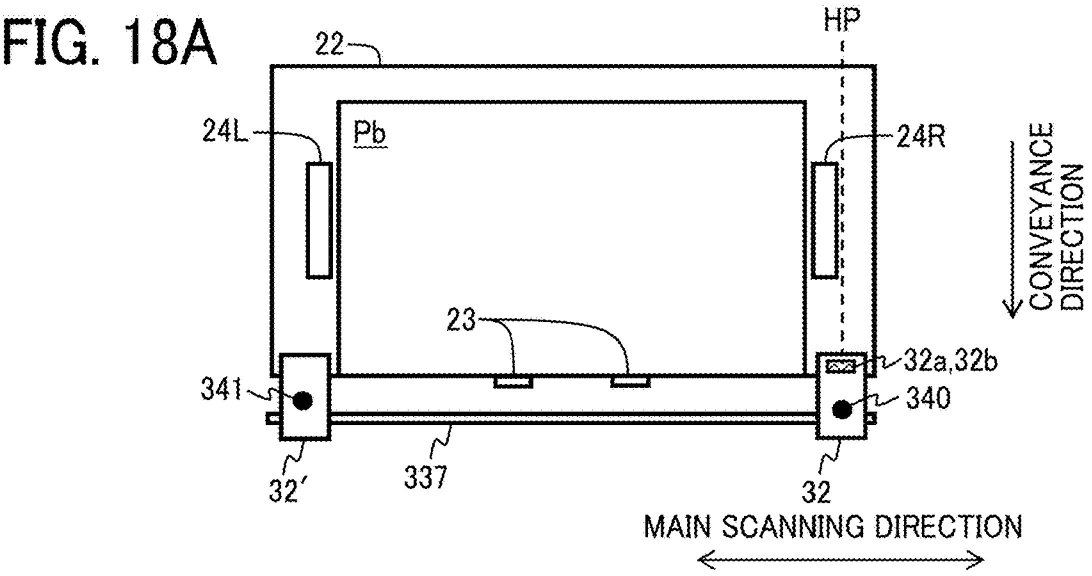
FIGS. 18A to 18C are views of an internal tray of the post-processing apparatus of FIG. 17 in a thickness direction of a sheet.
Figure 18B:
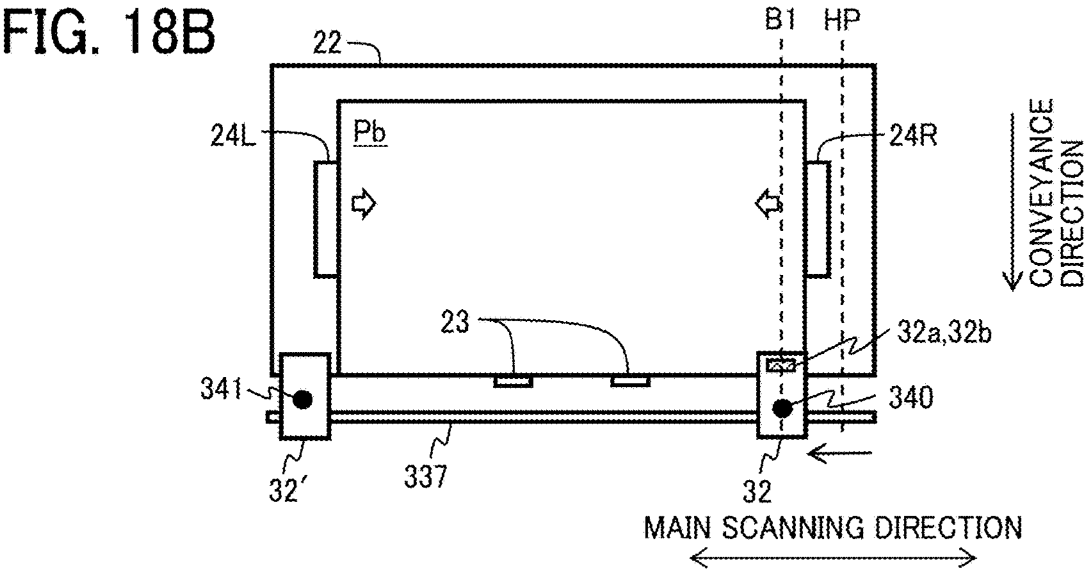
Figure 18C:
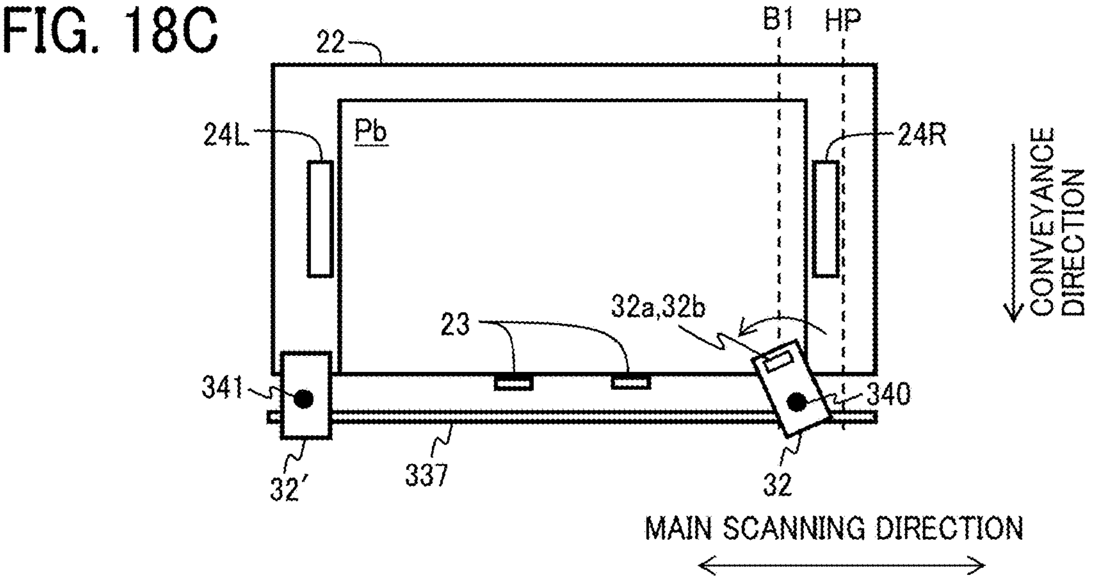

FIG. 17 is a diagram illustrating an internal configuration of the post-processing apparatus 3A according to the second embodiment of the present disclosure. As illustrated in FIGS. 18A to 18C, the edge binder 25 includes a crimper 32 and a stapler 32'. As illustrated in FIG. 17, the crimper 32 and the stapler 32' are disposed downstream from the internal tray 22 in the conveyance direction. In addition, the crimper 32 and the stapler 32' are located to face a downstream end, in the conveyance direction, of the sheet bundle Pb placed on the internal tray 22 and move in the main scanning direction. Further, the crimper 32 and the stapler 32' are pivoted about an axis extending in the thickness direction of the sheet bundle Pb placed on the internal tray 22. In other words, the crimper 32 and the stapler 32' bind, at a desired angle, a desired position in the main scanning direction on the sheet bundle Pb placed on the internal tray 22 in, for example, corner oblique binding, parallel one-point binding, or parallel two-point binding.

The crimper 32 presses and deforms the sheet bundle Pb with serrate binding teeth 32*a* and 32*b* to bind the sheet bundle Pb. In the following description, such a binding way may be referred to as "crimp binding." In other words, the crimper 32 crimps and binds the sheet bundle Pb or performs the crimp binding on the sheet bundle Pb. On the other hand, the stapler 32' passes the staple through a binding position on the sheet bundle Pb placed on the internal tray 22 to staple the sheet bundle Pb.

Figure 19:
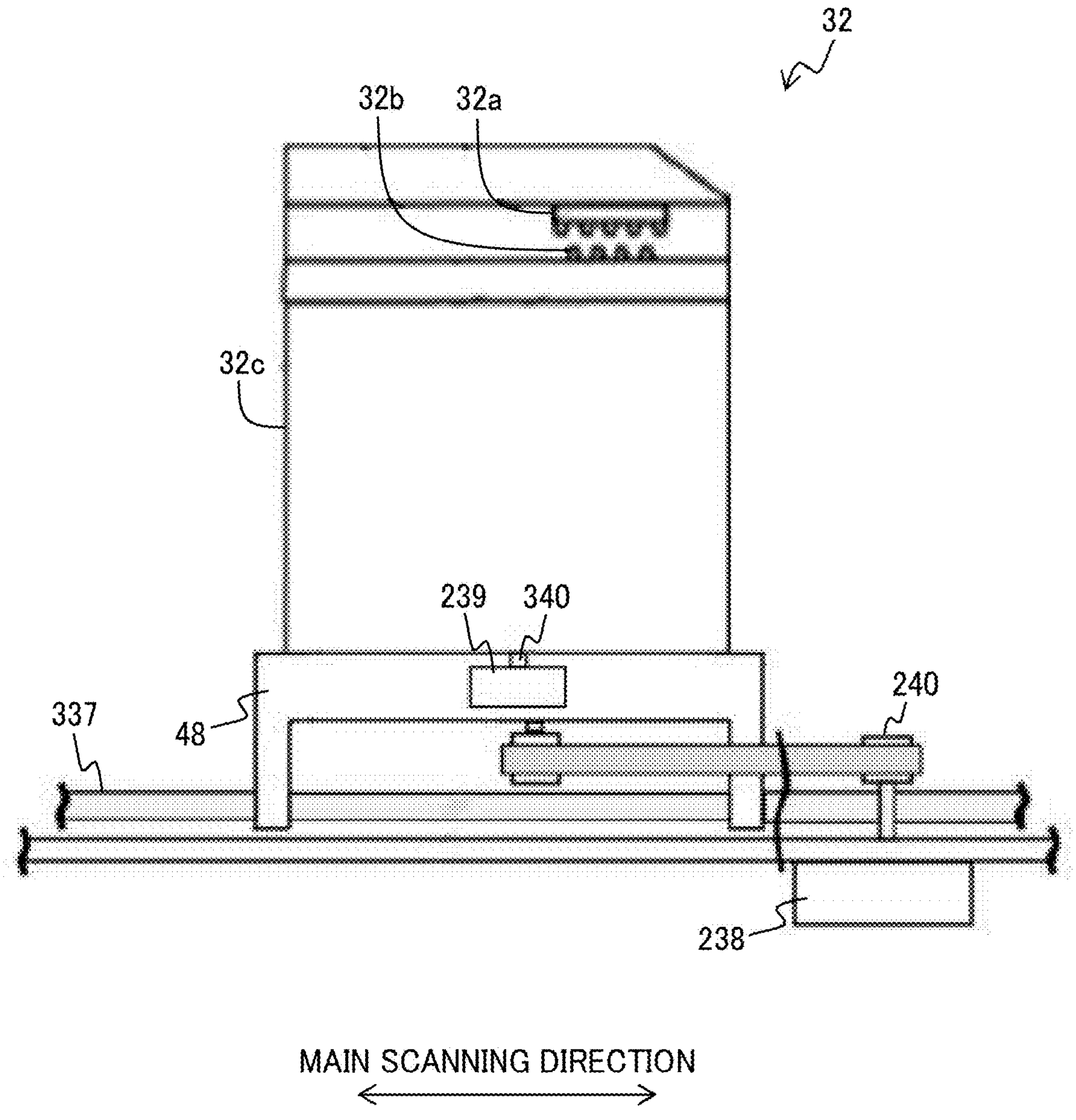
FIG. 19 is a schematic view of an upstream side of a crimper of the post-processing apparatus of FIG. 17 in a conveyance direction.

Each of FIGS. 18A to 18C is a view of the internal tray 22 in the thickness direction of the sheet bundle Pb. FIG. 19 is a schematic view of an upstream side of the crimper 32 in the conveyance direction. As illustrated in FIGS. 18A to 18C, the crimper 32 and the stapler 32' are disposed downstream from the internal tray 22 in the conveyance direction. The crimper 32 moves in the main scanning direction along the surface of the sheet bundle Pb placed on the internal tray 22. The crimper 32 is also pivoted about a pivot 340 extending in the thickness direction of the sheet bundle Pb placed on the internal tray 22. Similarly, the stapler 32' moves in the main scanning direction of the sheet bundle Pb and is pivoted about a pivot 341 extending in the thickness direction of the sheet bundle Pb.

More specifically, as illustrated in FIG. 19, a guide rail 337 extending in the main scanning direction is disposed downstream from the internal tray 22 in the conveyance direction. The crimper 32 is moved in the main scanning direction along the surface of the sheet bundle Pb placed on the internal tray 22, in other words, along the guide rail 337, by a driving force transmitted from a crimper movement motor 238 by a drive transmission assembly 240 including a pulley and a timing belt. The pivot 340 is fixed to a bottom face of the crimping frame 32*c* that holds the components of the crimper 32. The pivot 340 is rotatably held by the base 48 on which the crimping frame 32*c* is disposed. When a driving force is transmitted from a pivot motor 239 to the pivot 340, the crimper 32 is pivoted about the pivot 340 extending in the thickness direction of the sheet P placed on the internal tray 22. The guide rail 337, the crimper movement motor 238, the pivot motor 239, the pivot 340, and the drive transmission assembly 240 construct a driving assembly of the crimper 32.

The crimper 32 moves between the standby position HP illustrated in FIG. 18A and a position where the crimper 32 faces the binding position B1 illustrated in FIGS. 18B and 18C. The standby position HP is away in the main scanning direction from the sheet bundle Pb placed on the internal tray 22. For example, in FIGS. 18A to 18C, the standby position HP is distanced to the right of the sheet bundle Pb along the main scanning direction. The binding position B1 is a position on the sheet bundle Pb placed on the internal tray 22. However, the specific position of the binding position B1 is not limited to the position illustrated in FIGS. 18B and 18C. The binding position B1 may be one or more positions along the main scanning direction at the downstream end, in the conveyance direction, of the sheet P.

The posture of the crimper 32 changes or is pivoted between a parallel binding posture illustrated in FIG. 18B and an oblique binding posture illustrated in FIG. 18C. The parallel binding posture is a posture of the crimper 32 in which the length of the pair of binding teeth 32*a* and 32*b* (in other words, a rectangular crimp binding trace) is along the main scanning direction. The oblique binding posture is a posture of the crimper 32 in which the length of the pair of binding teeth 32*a* and 32*b* (in other words, the rectangular crimp binding trace) is inclined with respect to the main scanning direction.

The pivot angle, which is an angle of the pair of binding teeth 32*a* and 32*b* with respect to the main scanning direction, in the oblique binding posture is not limited to the angle illustrated in FIG. 18C. The pivot angle in the oblique binding posture may be any angle provided that the pair of binding teeth 32*a* and 32*b* faces the sheet bundle Pb placed on the internal tray 22.

Figure 25:
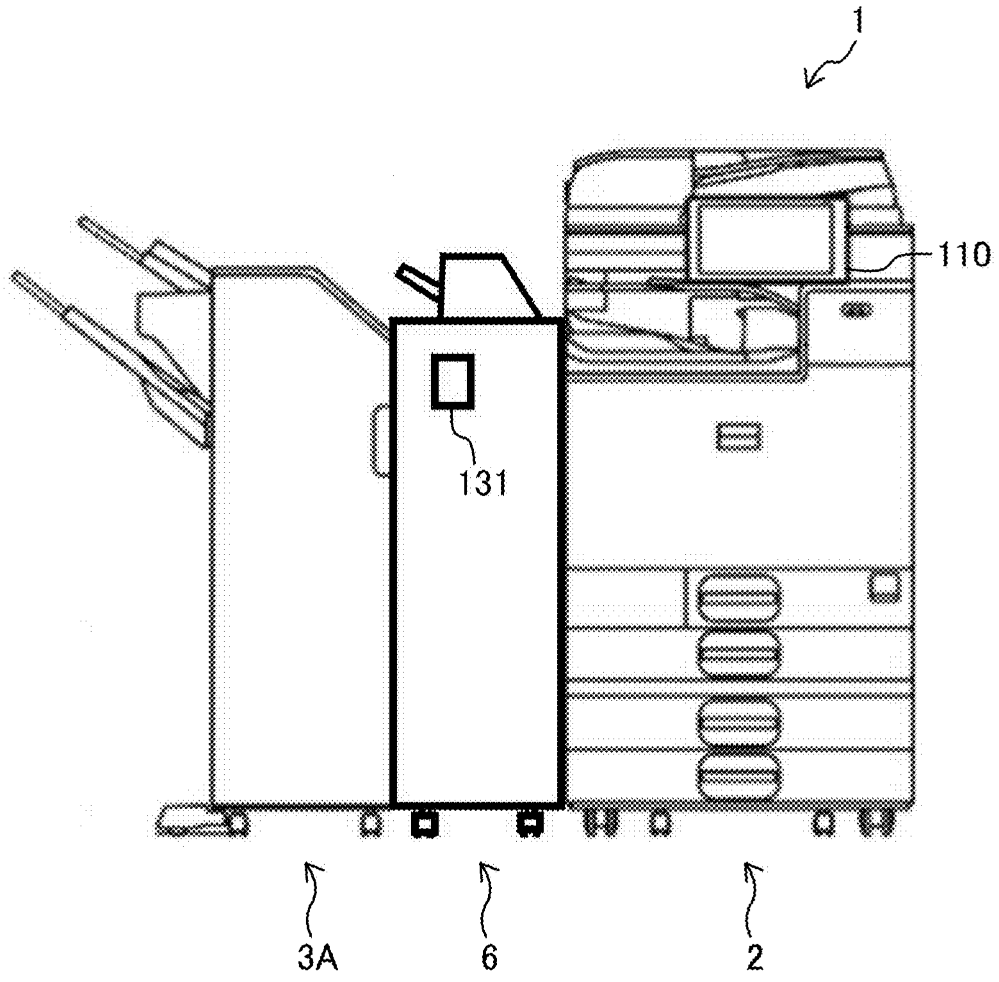
FIG. 25 is a diagram illustrating the overall configuration of an image forming system according to a modification of the above embodiments of the present disclosure.

The post-processing apparatus 3A includes the liquid applier 131 and a hole punch 132 serving as a processor. The liquid applier 131 and the hole punch 132 are disposed upstream from the internal tray 22 in the opposite conveyance direction. In addition, the liquid applier 131 and the hole punch 132 are disposed at different positions in the opposite conveyance direction to simultaneously face one sheet P that is conveyed by the conveyance roller pairs 10 to 19. The liquid applier 131 and the hole punch 132 according to the present embodiment are disposed between the conveyance roller pairs 10 and 11. However, the arrangement of the liquid applier 131 and the hole punch 132 is not limited to the arrangement illustrated in FIG. 17. For example, in a case where an inserter 6 is disposed between the image forming apparatus 2 and the post-processing apparatus 3A as illustrated in FIG. 25, the liquid applier 131 may be disposed inside the inserter 6 located upstream from the post-processing apparatus 3A in a direction in which the sheet P is conveyed from the image forming apparatus 2 to the post-processing apparatus 3A. Examples of the inserter 6 include, but are not limited to, an apparatus that allows a pre-printed medium, which is to be conveyed to the post-processing apparatus 3A together with the sheet P conveyed from the image forming apparatus 2, to be fed as a cover sheet, an insertion sheet, or a partition sheet without passing through the image forming apparatus 2.

Figure 20A:
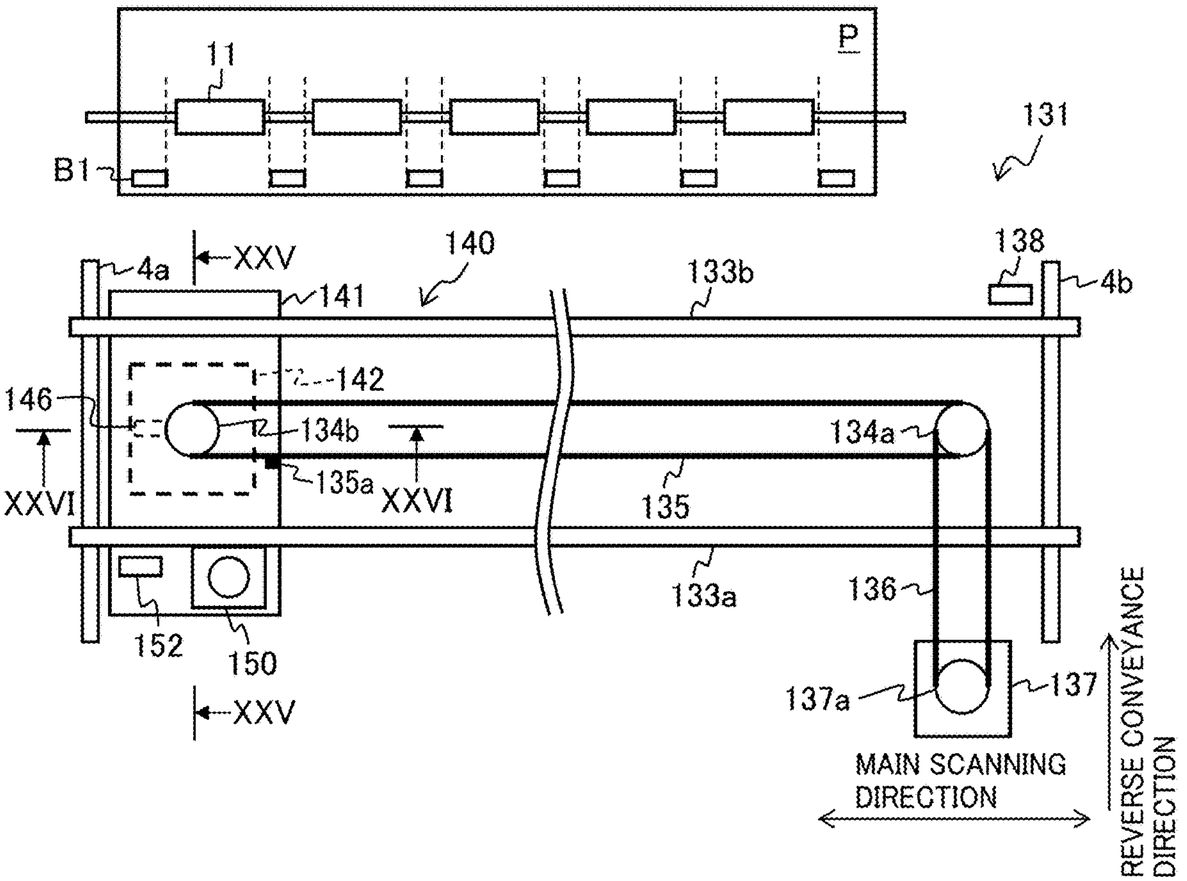
FIGS. 20A and 20B are views of a liquid applier of the post-processing apparatus of FIG. 17 in the thickness direction of the sheet.

As illustrated in FIG. 20A, the conveyance roller pair 11 is located so as not to overlap, in the main scanning direction, the liquid application position B1 on the sheet P to which the liquid has been applied by a liquid application head 146 of the liquid applier 131. This is to prevent the amount of liquid at the liquid application position B1 from decreasing due to the plurality of roller pairs pressing the liquid application position B1 when the conveyance roller pair 11 conveys the sheet P. As a result, when the sheet P reaches the crimper 32 disposed downstream from the liquid applier 131 in the opposite conveyance direction, the amount of liquid at the liquid application position B1 is sufficient to maintain the binding strength. Accordingly, the binding strength of the sheet bundle Pb is prevented from decreasing due to a decrease in the amount of liquid at the liquid application position B1 while the sheet P is conveyed. In addition, the plurality of roller pairs of the conveyance roller pair 11 that is located so as not to overlap the liquid application position B1 on the sheet P in the main scanning direction prevents the conveying performance of the sheet P from being worse due to the adhesion of liquid to the plurality of roller pairs and further prevents a conveyance jam caused when the conveying performance of the sheet P is worsened. Although only the conveyance roller pair 11 has been described above, the plurality of roller pairs of the conveyance roller pairs 14 and 15 are preferably located so as not to overlap the liquid application position B1 on the sheet P in the main scanning direction, like the plurality of roller pairs of the conveyance roller pair 11.

The liquid applier 131 applies liquid (for example, water) to the sheet P that is conveyed by the conveyance roller pairs 10 and 11. In the following description, the application of liquid may be referred to as "liquid application." The hole punch 132 punches a hole in the sheet P that is conveyed by the conveyance roller pairs 10 and 11 such that the hole penetrates the sheet P in the thickness direction of the sheet P. The processor disposed near the liquid applier 131 is not limited to the hole punch 132. Alternatively, the processor may be an inclination corrector that corrects an inclination or skew of the sheet P that is conveyed by the conveyance roller pairs 10 and 11.

Figure 20B:
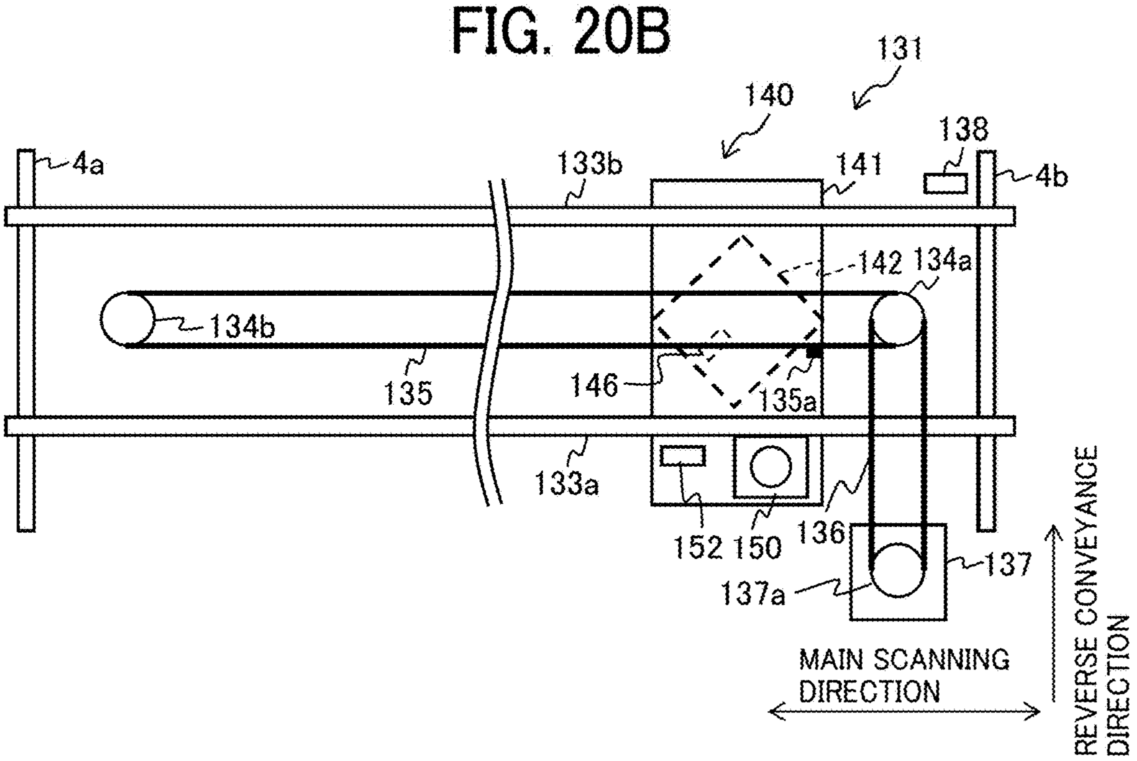
Figure 21A:
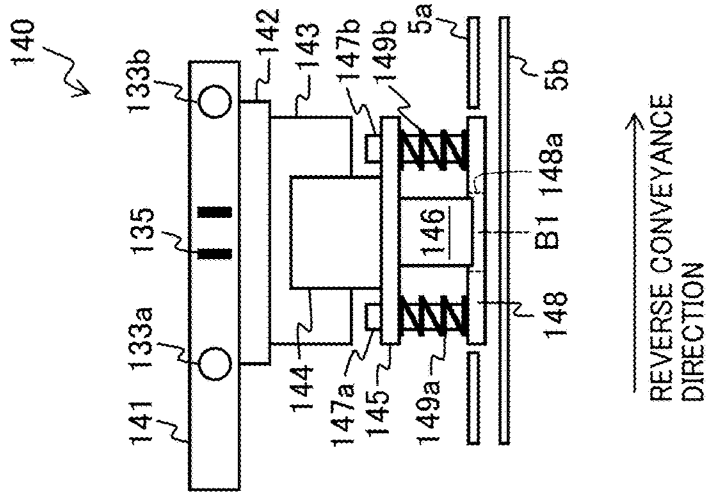
FIGS. 21A to 21C are cross-sectional views of a liquid application unit of the liquid applier taken through XXV-XXV of FIG. 20A.
Figure 21B:
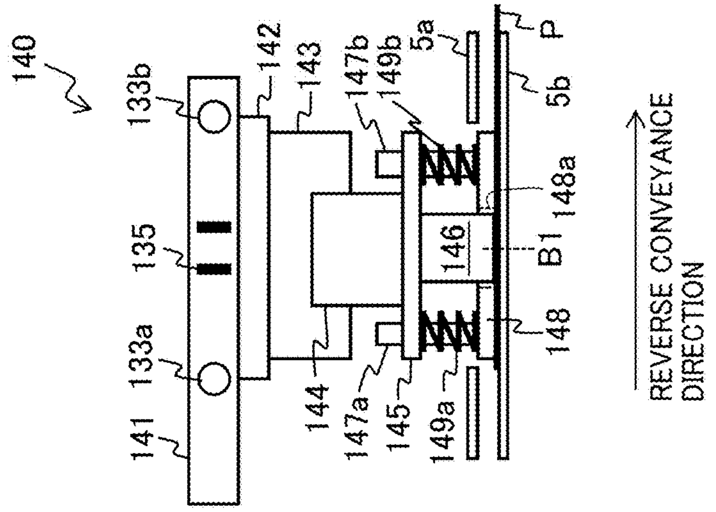
Figure 21C:
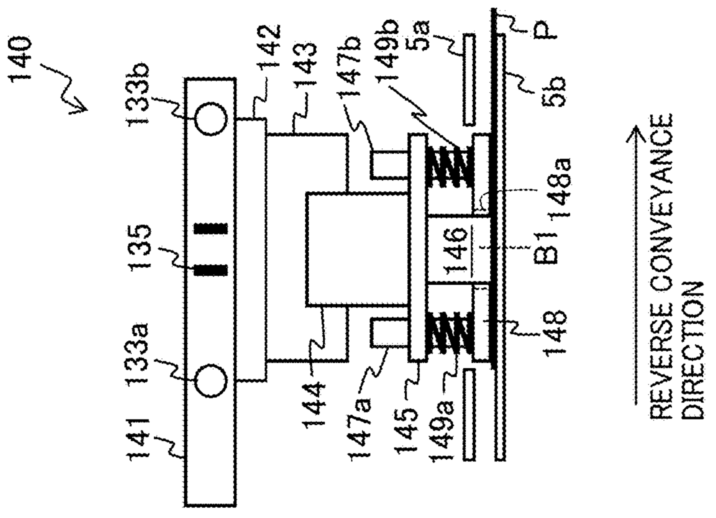
Figure 22A:
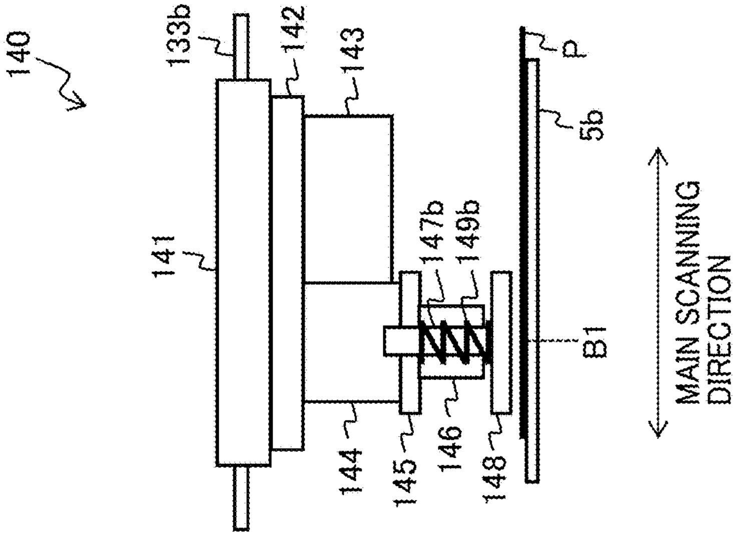
FIGS. 22A to 22C are cross-sectional views of the liquid application unit of the liquid applier taken through XXVI-XXVI of FIG. 20A.
Figure 22B:
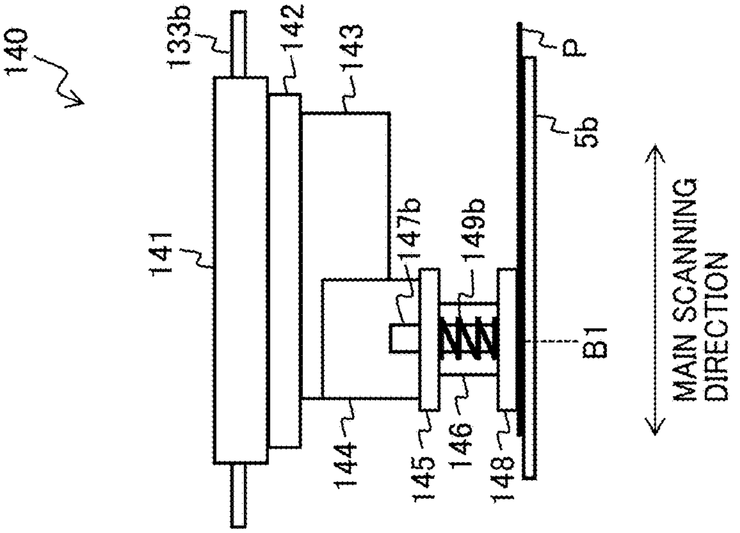
Figure 22C:
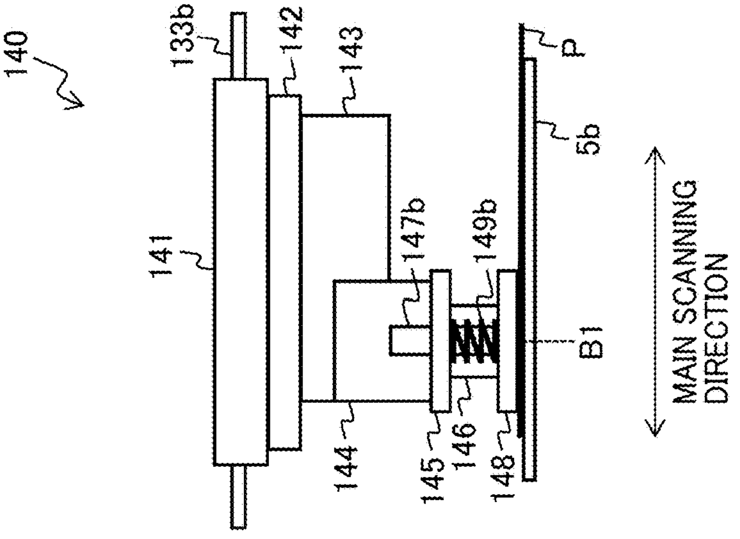
Figure 23:
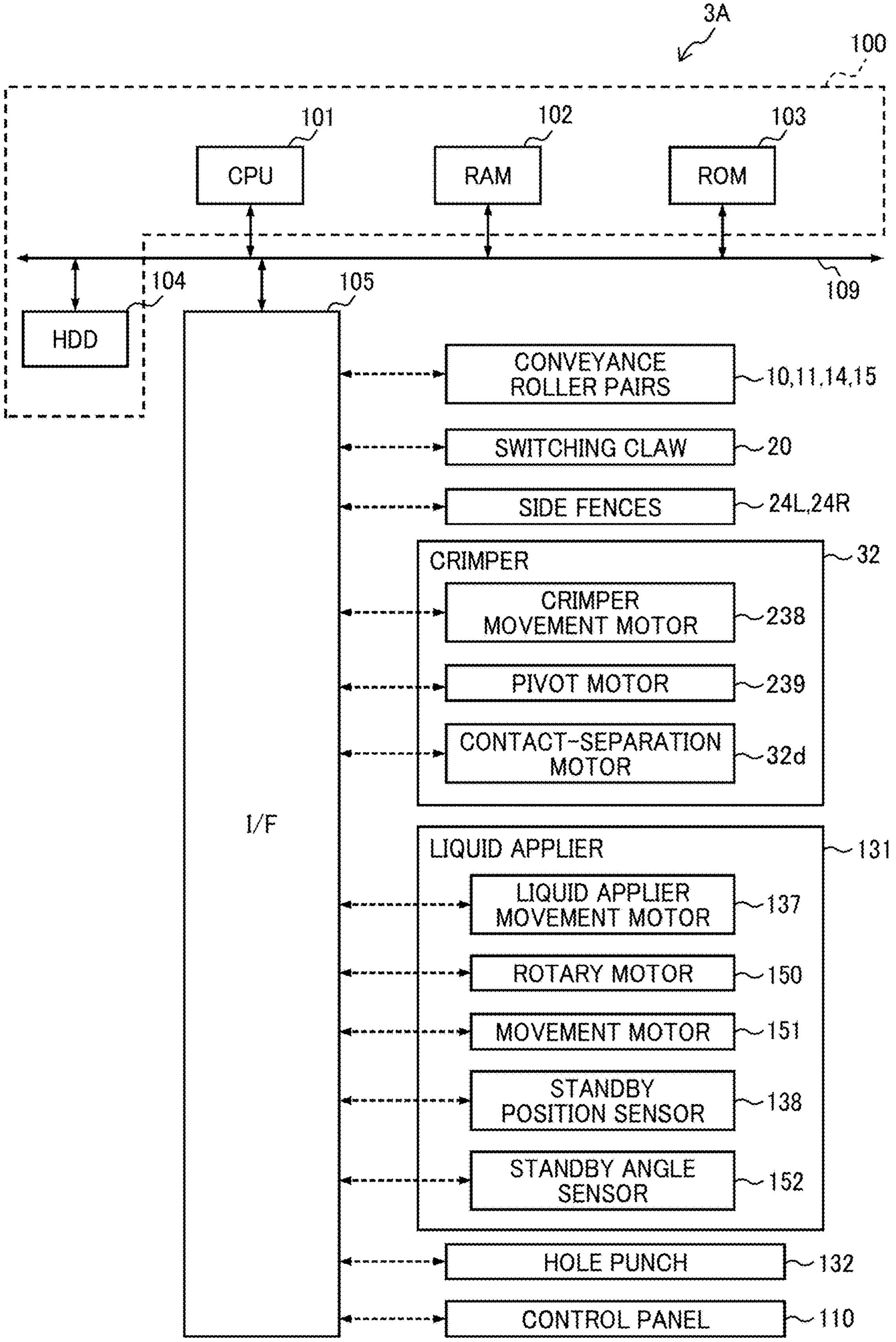
FIG. 23 is a block diagram illustrating a hardware configuration of the post-processing apparatus of FIG. 17 to control the operation of the post-processing apparatus.

FIGS. 20A and 20B are views of the liquid applier 131 in the thickness direction of the sheet P, according to the second embodiment of the present disclosure. FIGS. 21A to 21C are cross-sectional views of a liquid application unit 140 of the liquid applier 131 taken through XXV-XXV of FIG. 20A. FIGS. 22A to 22C are cross-sectional views of the liquid application unit 140 of the liquid applier 131 taken through XXVI-XXVI of FIG. 20A. As illustrated in FIGS. 20A to 22C, the liquid applier 131 includes a pair of guide shafts 133*a* and 133*b*, a pair of pulleys 134*a* and 134*b*, endless annular belts 135 and 136, a liquid applier movement motor 137, a standby position sensor 138, which is also illustrated in FIG. 23, and the liquid application unit 140.

The guide shafts 133*a* and 133*b*, each extending in the main scanning direction, are apart from each other in the reverse conveyance direction. The pair of guide shafts 133*a* and 133*b* is supported by a pair of side plates 4*a* and 4*b* of the post-processing apparatus 3A. On the other hand, the pair of guide shafts 133*a* and 133*b* supports the liquid application unit 140 such that the liquid application unit 140 can move in the main scanning direction.

The pair of pulleys 134*a* and 134*b* is disposed between the guide shafts 133*a* and 133*b* in the reverse conveyance direction. On the other hand, the pulleys 134*a* and 134*b* are apart from each other in the main scanning direction. The pair of pulleys 134*a* and 134*b* is supported by a frame of the post-processing apparatus 3A so as to be rotatable about an axis extending in the thickness direction of the sheet P.

The endless annular belt 135 is entrained around the pair of pulleys 134*a* and 134*b*. The endless annular belt 135 is coupled to the liquid application unit 140 by a connection 135*a*. The endless annular belt 136 is entrained around the pulley 134*a* and a driving pulley 137*a* that is fixed to an output shaft of the liquid applier movement motor 137. The liquid applier movement motor 137 generates a driving force to move the liquid application unit 140 in the main scanning direction.

As the liquid applier movement motor 137 rotates, the endless annular belt 136 circulates around the pulley 134*a* and the driving pulley 137*a* to rotate the pulley 134*a*. As the pulley 134*a* rotates, the endless annular belt 135 circulates around the pair of pulleys 134*a* and 134*b*. As a result, the liquid application unit 140 moves in the main scanning direction along the pair of guide shafts 133*a* and 133*b*. The liquid application unit 140 reciprocates in the main scanning direction in response to the rotation direction of the liquid applier movement motor 137 being switched.

The standby position sensor 138 detects that the liquid application unit 140 has reached a standby position in the main scanning direction. The standby position sensor 138 then outputs a standby position signal indicating the detection result to the controller 100, which will be described below with reference to FIG. 22. The standby position sensor 138 is, for example, an optical sensor including a light emitting unit and a light receiving unit. The liquid application unit 140 at the standby position blocks an optical path between the light emitting unit and the light receiving unit. Then, the standby position sensor 138 outputs the standby position signal in response to the light output from the light emitting unit not being received by the light receiving unit. The specific configuration of the standby position sensor 138 is not limited to the configuration described above.

As illustrated in FIGS. 21A to 21C, the conveyance passage inside the post-processing apparatus 3A is defined by an upper guide plate 5*a* and a lower guide plate 5*b*, which are apart from each other in the thickness direction of the sheet P. The liquid application unit 140 is located to face an opening of the upper guide plate 5*a*. In other words, the liquid application unit 140 faces the conveyance passage through the opening of the upper guide plate 5*a* to face the sheet P conveyed along the conveyance passage.

As illustrated in FIGS. 20A to 22C, the liquid application unit 140 includes a base 141, a rotary bracket 142, a liquid storage tank 143, a mover 144, a holder 145, the liquid application head 146, columns 147*a* and 147*b*, a pressure plate 148, coil springs 149*a* and 149*b*, a rotary motor 150, a movement motor 151 illustrated in FIG. 23, and a standby angle sensor 152, which is also illustrated in FIG. 23.

The base 141 is supported by the pair of guide shafts 133*a* and 133*b* so as to be slidable in the main scanning direction. The base 141 is coupled to the endless annular belt 135 by the connection 135*a*. On the other hand, the base 141 supports the components of the liquid application unit 140 such as the rotary bracket 142, the liquid storage tank 143, the mover 144, the holder 145, the liquid application head 146, the columns 147*a* and 147*b*, the pressure plate 148, the coil springs 149*a* and 149*b*, the rotary motor 150, the movement motor 151, and the standby angle sensor 152.

The rotary bracket 142 is supported by a lower face of the base 141 so as to be pivotable about an axis extending in the thickness direction of the sheet P. The rotary bracket 142 is rotated with respect to the base 141 by a driving force transmitted from the rotary motor 150. On the other hand, the rotary bracket 142 supports the liquid storage tank 143, the mover 144, the holder 145, the liquid application head 146, the columns 147*a* and 147*b*, the pressure plate 148, and the coil springs 149*a* and 149*b*.

The standby angle sensor 152, which is also illustrated in FIG. 23, detects that the rotary bracket 142 has reached a standby angle. The standby angle sensor 152 then outputs a standby angle signal indicating the detection result to the controller 100. The standby angle is, for example, an angle for the parallel binding. The standby angle sensor 152 is, for example, an optical sensor including a light emitting unit and a light receiving unit. The rotary bracket 142 at the standby angle blocks an optical path between the light emitting unit and the light receiving unit. Then, the standby angle sensor 152 outputs the standby angle signal in response to the light output from the light emitting unit not being received by the light receiving unit. The specific configuration of the standby angle sensor 152 is not limited to the configuration described above.

Note that FIG. 20A illustrates the rotary bracket 142 in a position for the parallel binding that is performed by the crimper 32 disposed downstream from the liquid applier 131 in a direction in which the sheet P is conveyed. FIG. 20B illustrates the rotary bracket 142 in a position for the oblique binding (i.e., corner binding) that is performed by the crimper 32 disposed downstream from the liquid applier 131 in the direction in which the sheet P is conveyed.

The liquid storage tank 143 stores liquid to be applied to the sheet P. The mover 144 is supported by the liquid storage tank 143 so as to be movable (for example, up and down) in the thickness direction of the sheet P. The mover 144 is moved with respect to the liquid storage tank 143 by a driving force transmitted from the movement motor 151. The holder 145 is attached to a lower end of the mover 144. The liquid application head 146 projects from the holder 145 toward the conveyance passage (downward in the present embodiment). The liquid that is stored in the liquid storage tank 143 is supplied to the liquid application head 146. The liquid application head 146 is made of a material having a relatively high liquid absorption (for example, sponge or fiber).

The columns 147*a* and 147*b* project downward from the holder 145 around the liquid application head 146. The columns 147*a* and 147*b* can move relative to the holder 145 in the thickness direction. The columns 147*a* and 147*b* have respective lower ends holding the pressure plate 148. The pressure plate 148 has a through hole 148*a* at a position where the through hole 148*a* faces the liquid application head 146. The coil springs 149*a* and 149*b* are fitted around the columns 147*a* and 147*b*, respectively, between the holder 145 and the pressure plate 148. The coil springs 149*a* and 149*b* bias the columns 147*a* and 147*b* and the pressure plate 148 downward with respect to the holder 145.

As illustrated in FIGS. 21A and 22A, before the sheet P is conveyed to the position where the sheet P faces the opening of the upper guide plate 5*a*, the pressure plate 148 is positioned at or above the opening. Next, when the sheet P that is conveyed by the conveyance roller pairs 10 and 11 stops at a position where the liquid application position B1 on the sheet P faces the opening, the movement motor 151 is rotated in a first direction. As a result, the mover 144, the holder 145, the liquid application head 146, the columns 147*a* and 147*b*, the pressure plate 148, and the coil springs 149*a* and 149*b* are moved down together to allow the pressure plate 148 to contact the sheet P. Note that the liquid application position B1 corresponds to the binding position to be crimped and bound by the edge binder 25.

As the movement motor 151 keeps rotating in the first direction after the pressure plate 148 contacts the sheet P, the coil springs 149*a* and 149*b* are compressed to further move down the mover 144, the holder 145, the liquid application head 146, and the columns 147*a* and 147*b*. As a result, as illustrated in FIGS. 21B and 22B, a lower face of the liquid application head 146 contacts the sheet P through the through hole 148*a*. Then, the liquid contained in the liquid application head 146 is applied to the sheet P.

Further rotation of the movement motor 151 in the first direction further strongly presses the liquid application head 146 against the sheet P as illustrated in FIGS. 21C and 22C. Accordingly, the amount of liquid that is applied to the sheet P increases. In short, the liquid applier 131 changes the pressing force of the liquid application head 146 against the sheet P to adjust the amount of liquid that is applied to the sheet P.

On the other hand, the rotation of the movement motor 151 in a second direction opposite to the first direction moves up the mover 144, the holder 145, the liquid application head 146, the columns 147*a* and 147*b*, the pressure plate 148, and the coil springs 149*a* and 149*b* together. As a result, as illustrated in FIGS. 21A and 22A, the liquid application head 146 and the pressure plate 148 are separated from the sheet P. In other words, the liquid applier 131 includes the liquid application head 146 that can be separated from the sheet P.

FIG. 23 is a block diagram illustrating a hardware configuration of the post-processing apparatus 3A to control the operation of the post-processing apparatus 3A according to the second embodiment of the present disclosure. As illustrated in FIG. 22, the post-processing apparatus 3A includes the CPU 101, the RAM 102, the ROM 103, the HDD 104, and the I/F 105. The CPU 101, the RAM 102, the ROM 103, the HDD 104, and the I/F 105 are connected to each other via the common bus 109.

The CPU 101 is an arithmetic unit and controls the overall operation of the post-processing apparatus 3A. The RAM 102 is a volatile storage medium that allows data to be read and written at high speed. The CPU 101 uses the RAM 102 as a working area for data processing. The ROM 103 is a read-only non-volatile storage medium that stores programs such as firmware. The HDD 104 is a non-volatile storage medium that allows data to be read and written and has a relatively large storage capacity. The HDD 104 stores, e.g., an operating system (OS), various control programs, and application programs.

By an arithmetic function of the CPU 101, the post-processing apparatus 3A processes, for example, a control program stored in the ROM 103 and an information processing program (application program) loaded into the RAM 102 from a storage medium such as the HDD 104. Such processing configures a software controller including various functional modules of the post-processing apparatus 3A. The software controller thus configured cooperates with hardware resources of the post-processing apparatus 3A to construct functional blocks that implement functions of the post-processing apparatus 3A. In other words, the CPU 101, the RAM 102, the ROM 103, and the HDD 104 construct the controller 100 that controls the operation of the post-processing apparatus 3A.

The I/F 105 is an interface that connects the conveyance roller pairs 10, 11, 14, and 15, the switching claw 20, the side fences 24L and 24R, the crimper 32, the liquid applier 131, the hole punch 132, and the control panel 110 to the common bus 109. The controller 100 controls, via the I/F 105, the operations of the conveyance roller pairs 10, 11, 14, and 15, the switching claw 20, the side fences 24L and 24R, the crimper 32, the liquid applier 131, and the hole punch 132. Although FIG. 22 illustrates the components that execute the edge stitching process, the components that execute the saddle stitching process are also similarly controlled by the controller 100.

The control panel 110 includes an operation unit that receives instructions input by a user and a display serving as a notifier that notifies the user of information. The operation unit includes, for example, hard keys and a touch screen overlaid on a display. The control panel 110 acquires information from the user through the operation unit and provides information to the user through the display.

Figure 24:
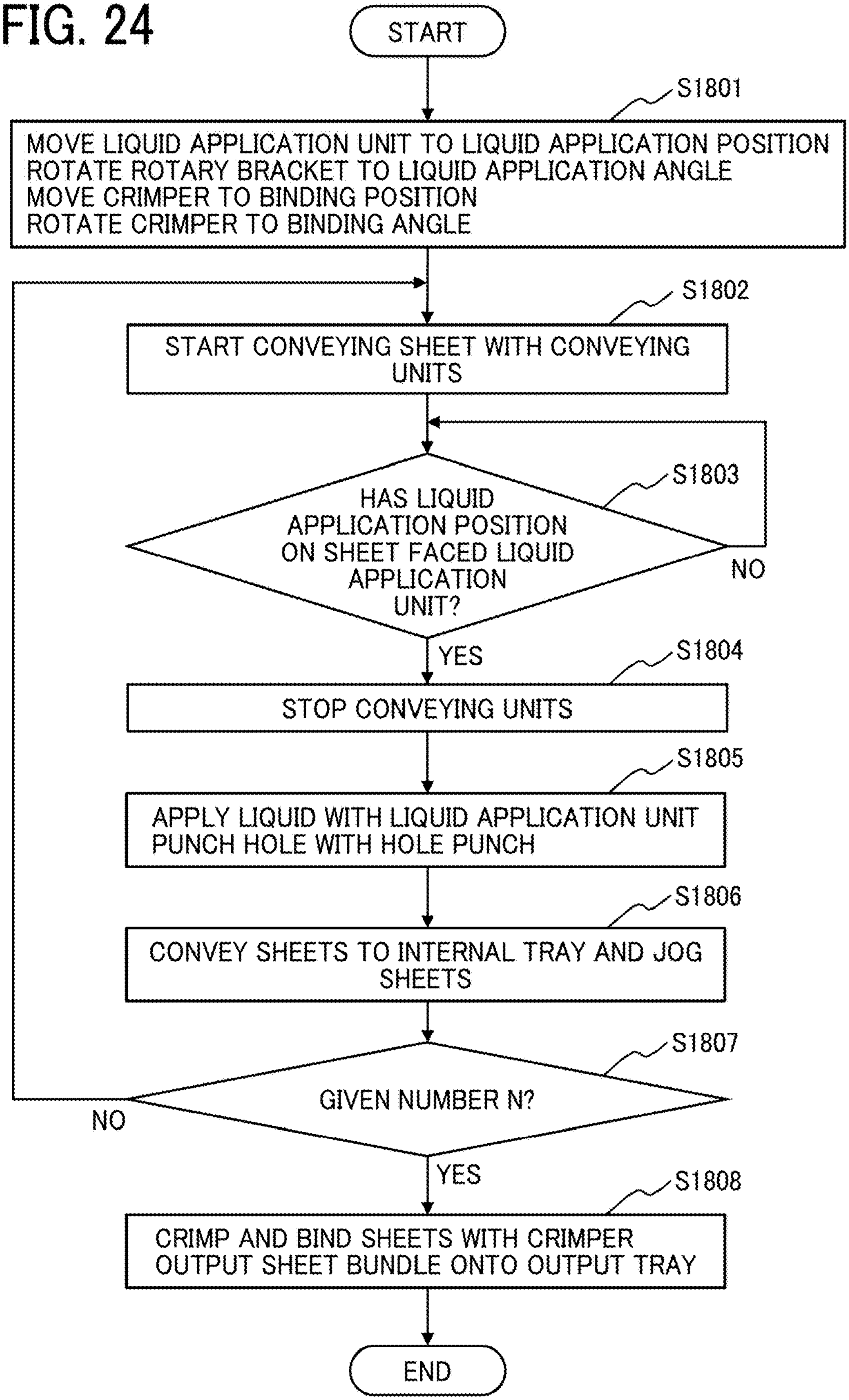
FIG. 24 is a flowchart of post-processing performed by the post-processing apparatus of FIG. 17.

FIG. 24 is a flowchart of post-processing performed by the post-processing apparatus 3A according to the second embodiment. Specifically, FIG. 24 is a flowchart of a process to execute the one-point binding illustrated in FIGS. 18A to 18C. For example, the controller 100 executes the post-processing illustrated in FIG. 24 when the controller 100 acquires an instruction to execute the post-processing from the image forming apparatus 2. In the following description, the instruction to execute the post-processing may be referred to as a "post-processing command." The post-processing command includes, for example, the number of sheets P of the sheet bundle Pb, the binding position (i.e., the liquid application position B1), a binding angle (i.e., a liquid application angle), and a process executed in parallel with the liquid application process (i.e., punching a hole in the present embodiment). In the following description, the number of sheets P of the sheet bundle Pb may be referred to as a "given number N." Note that, at the start of the post-processing, the liquid application unit 140 is at the standby position HP corresponding to the standby position HP illustrated in FIGS. 12A to 12D whereas the rotary bracket 142 is held at the standby angle.

First, in step S1801, the controller 100 drives the liquid applier movement motor 137 to move the liquid application unit 140 in the main scanning direction such that liquid application head 146 moves from the standby position HP to a position where the liquid application head 146 can face the liquid application position B1 corresponding to the binding position B1 illustrated in FIGS. 12B and 12C. In addition, in step S1801, the controller 100 drives the rotary motor 150 to rotate the rotary bracket 142 such that the liquid application head 146 rotates from the standby angle to the liquid application angle. It is ascertained based on a pulse signal output from a rotary encoder of the liquid applier movement motor 137 that the liquid application head 146 has reached the position where the liquid application head 146 can face the liquid application position B1. Similarly, it is ascertained based on a pulse signal output from a rotary encoder of the rotary motor 150 that the liquid application head 146 has reached the liquid application angle. Further, in step S1801, the controller 100 drives the crimper movement motor 238 to move the crimper 32 from the standby position HP to the position where the crimper 32 can face the binding position B1 as illustrated in FIGS. 18A and 18B. Furthermore, in step S1801, the controller 100 drives the pivot motor 239 to rotate the crimper 32 from the standby angle to the binding angle, which may be referred to as a crimp binding angle in the following description. It is ascertained based on a pulse signal output from a rotary encoder of the crimper movement motor 238 that the crimper 32 has reached the position where the crimper 32 can face the binding position B1. Similarly, it is ascertained based on a pulse signal output from a rotary encoder of the pivot motor 239 that the crimper 32 has reached the crimp binding angle.

Subsequently, in step S1802, the controller 100 drives the conveyance roller pairs 10 and 11 to start conveying the sheet P on which an image is formed by the image forming apparatus 2. In step S1803, the controller 100 determines whether the liquid application position B1 on the sheet P has faced the liquid application unit 140 (more specifically, the liquid application head 146). When the liquid application position B1 on the sheet P has not faced the liquid application head 146 (NO in step S1803), the controller 100 repeats the determination in step S1803. In other words, the controller 100 continues driving the conveyance roller pairs 10 and 11 until the liquid application position B1 on the sheet P faces the liquid application head 146. By contrast, when the liquid application position B1 on the sheet P has faced the liquid application head 146 (YES in step S1803), in step S1804, the controller 100 stops the conveyance roller pairs 10 and 11. It is ascertained based on a pulse signal output from a rotary encoder of a motor that drives the conveyance roller pairs 10 and 11 that the liquid application position B1 on the sheet P has faced the liquid application head 146.

In step S1805, the controller 100 executes the process of applying the liquid to the liquid application position B1 on the sheet P with the liquid applier 131 and the process of punching a hole in the sheet P with the hole punch 132 in parallel. More specifically, the controller 100 rotates the movement motor 151 in the first direction to bring the liquid application head 146 into contact with the liquid application position B1 on the sheet P. In addition, the controller 100 changes the pressing force of the liquid application head 146 (in other words, the amount of rotation of the movement motor 151) depending on the amount of liquid that is applied to the sheet P.

The amount of liquid that is applied to the sheet P may be the same for all the sheets P of the sheet bundle Pb or may be different for each sheet P. For example, the controller 100 may apply a decreased amount of liquid to the sheet P conveyed later. The amount of rotation of the movement motor 151 may be ascertained based on a pulse signal output from a rotary encoder of the movement motor 151.

In step S1806, the controller 100 drives the conveyance roller pairs 10, 11, 14, and 15 to place the sheet P on the internal tray 22. The controller 100 moves the side fences 24L and 24R to align the position of the sheet bundle Pb placed on the internal tray 22 in the main scanning direction. In short, the controller 100 performs so-called jogging.

In step S1807, the controller 100 determines whether or not the number of sheets P placed on the internal tray 22 has reached the given number N of sheets indicated by the post-processing command. When the controller 100 determines that the number of sheets P placed on the internal tray 22 has not reached the given number N of sheets (NO in step S1807), the controller 100 executes the operations of steps S1802 to S1806 again.

By contrast, when the controller 100 determines that the number of sheets P that are placed on the internal tray 22 has reached the given number N of sheets (YES in step S1807), in step S1808, the controller 100 causes the crimper 32 to crimp and bind the binding position B1 (i.e., the liquid application position B1) on the sheet bundle Pb to which the liquid has been applied by the liquid applier 131. In addition, in step S1808, the controller 100 rotates the conveyance roller pair 15 to output the sheet bundle Pb thus crimped and bound to the output tray 26. Then, the controller 100 drives the liquid applier movement motor 137 to move the liquid applier 131 to the standby position HP and drives the crimper movement motor 238 to move the crimper 32 to the standby position HP.

The embodiments of the present disclosure are applied to the edge binder 25 that executes the edge stitching as described above. However, the embodiments of the present disclosure may be applied to the saddle binder 28 that executes the saddle stitching.

The present disclosure is not limited to specific embodiments described above, and numerous additional modifications and variations are possible in light of the teachings within the technical scope of the appended claims. It is therefore to be understood that the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

Now, a description is given of some aspects of the present disclosure.

Initially, a description is given of a first aspect.

A medium processing apparatus includes: a conveyor to convey a medium; a liquid applier to apply liquid to a part of the medium conveyed by the conveyor; the medium being at least one medium; and a crimper to press and deform a bundle of media including the medium to which the liquid is applied by the liquid applier, to bind the bundle of media. The liquid applier adjusts an application amount of the liquid in the liquid application according to an environmental condition that is a factor that affects a binding strength with which the bundle of media is bound by pressing and deforming of the crimper.

Now, a description is given of a second aspect.

In the medium processing apparatus according to the above-described aspect 1, the environmental condition is a temperature condition in pre-processing on the medium in an external apparatus connected to an upstream side of the medium processing apparatus in a direction in which the medium is conveyed by the conveyor. When a temperature in the pre-processing is higher than a predetermined temperature threshold, the liquid application amount is increased to be larger than a preset amount.

Now, a description is given of a third aspect.

In the medium processing apparatus according to the above-described aspect 1 or 2, the environmental condition is a length of a conveyance path by which the medium is conveyed from a position at which the liquid applier applies the liquid to the medium to a binding position at which the crimper binds the bundle of media including the medium. When the length of the conveyance path is longer than a predetermined distance threshold value, the application amount of the liquid is increased to be larger than a preset amount.

Now, a description is given of a fourth aspect.

In the medium processing apparatus according to any of the above-described aspects 1 to 3, the environmental condition is an ambient temperature of the medium at a position at which the liquid applier applies the liquid to the medium. When the ambient temperature of the medium is higher than a predetermined ambient temperature threshold, the application amount of the liquid is increased to be larger than a preset amount.

Now, a description is given of a fifth aspect.

An image forming system includes: an image forming apparatus including an image former to form an image on a plurality of media; and the medium processing apparatus according to any of the above-described aspects 1 to 4 to crimp and bind the plurality of media on which the image is formed by the image forming apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A medium processing apparatus, comprising:

a conveyor configured to convey a medium;

a liquid applier configured to perform liquid application of applying liquid to a part of the medium conveyed by the conveyor, the medium being at least one medium; and a crimper configured to press and deform a bundle of media including the medium to which the liquid is applied by the liquid applier, to bind the bundle of media, wherein the liquid applier is configured to adjust an application amount of the liquid in the liquid application according to an environmental condition that is a factor that affects a binding strength with which the bundle of media is bound by pressing and deforming of the crimper, wherein the environmental condition includes a length of a conveyance path by which the medium is conveyed from a position at which the liquid applier applies the liquid to the medium to a binding position at which the crimper binds the bundle of media including the medium, and wherein when the length of the conveyance path is longer than a predetermined distance threshold value, the application amount of the liquid is increased to be larger than a preset amount.

2. The medium processing apparatus according to claim 1, wherein the environmental condition further includes a temperature condition in pre-processing on the medium in an external apparatus connected to an upstream side of the medium processing apparatus in a direction in which the medium is conveyed by the conveyor, and wherein the application amount of the liquid is increased to be larger than a preset amount when a temperature in the pre-processing is higher than a predetermined temperature threshold.

3. The medium processing apparatus according to claim 1, wherein the environmental condition further includes an ambient temperature of the medium at the position at which the liquid applier applies the liquid to the medium, and wherein when the ambient temperature of the medium is higher than a predetermined ambient temperature threshold, the application amount of the liquid is increased to be larger than a preset amount.

4. An image forming system, comprising:

an image forming apparatus including an image former configured to form an image on a plurality of media; and the medium processing apparatus according to claim 1 configured to crimp and bind the plurality of media on which the image is formed by the image forming apparatus.

* * * * *